US012652074B2

(12) United States Patent (10) Patent No.: US 12,652,074 B2
Nabki et al. (45) Date of Patent: Jun. 9, 2026

(54) ULTRA WIDEBAND RADIO DEVICES AND METHODS

(71) Applicant: SPARK MICROSYSTEMS INC., Montreal (CA)

(72) Inventors: Frederic Nabki, Montreal (CA); Gabriel Morin-Laporte, Montreal (CA); Mohammad Rahmani, Longeueil (CA); Mohammad Taherzadeh-Sani, Montreal (CA)

(73) Assignee: Spark Microsystems International Inc., Montreal (CA)

( * ) Notice: Subject to any disclaimer, the term of this patent is extended or adjusted under 35 U.S.C. 154(b) by 80 days.

(21) Appl. No.: 18/699,640

(22) PCT Filed: Oct. 14, 2022

(86) PCT No.: PCT/CA2022/051510
§ 371 (c)(1),
(2) Date: Apr. 9, 2024

(87) PCT Pub. No.: WO2023/060353
PCT Pub. Date: Apr. 20, 2023

(65) Prior Publication Data
US 2026/0039327 A1 Feb. 5, 2026

Related U.S. Application Data

(60) Provisional application No. 63/255,813, filed on Oct. 14, 2021.

(51) Int. Cl.
*H04B 1/00* (2006.01)
*H01Q 21/06* (2006.01)
(Continued)

(52) U.S. Cl.
CPC ......... *H04B 1/7176* (2013.01); *H01Q 21/062* (2013.01); *H04B 1/719* (2013.01);
(Continued)

(58) Field of Classification Search
CPC ............... H04B 1/7183; H04B 1/7163; H04B 1/71634; H04B 1/69; H04B 7/0837;
(Continued)

(56) References Cited

U.S. PATENT DOCUMENTS 7,242,707 B1 * 7/2007 Miao .................. H04B 1/71637
375/144
2003/0032422 A1 * 2/2003 Wynbeek ............... H04B 1/005
455/422.1
(Continued)

FOREIGN PATENT DOCUMENTS

WO 2020186332 A1 9/2020

*Primary Examiner* — Khai Tran
(74) *Attorney, Agent, or Firm* — Rosenberg, Klein & Lee

(57) ABSTRACT

Ultra-Wideband (UWB) technology is a wireless technology supporting the transmission of large amounts of digital data over short distances using coded impulses over a wide frequency spectrum with very low power. Enhanced link performance and functionality of such UWB systems is presented exploiting multiple directive antennas for spatially filtering undesired signals and increasing signal strength whilst circuit complexity is reduced by eliminating baluns in prior art solutions. Further enhancements support payloads with flexible encoding schemes, improved channel utilization, reduced processing logic, improved robustness in correlation techniques, versatile synchronisation techniques, improved ranging, as well as providing for improved inter-symbol interference tolerance and detection.

12 Claims, 15 Drawing Sheets

(51) Int. Cl.
    *H04B 1/7176*     (2011.01)
    *H04B 1/719*     (2011.01)
    *H04L 25/49*     (2006.01)
    *G06F 13/42*     (2006.01)

(52) U.S. Cl.
    CPC ...... *H04L 25/4902* (2013.01); *G06F 13/4282*
            (2013.01); *H04B 2201/71634* (2013.01)

(58) Field of Classification Search
    CPC .... H04L 25/4902; H04L 7/041; H04W 4/023;
              H04W 12/06; G06F 13/4022
    USPC ......................................................... 375/130
    See application file for complete search history.

(56)            References Cited

U.S. PATENT DOCUMENTS

| | | | |
|---|---|---|---|
| 2007/0081577 A1* | 4/2007 | Reunamaki ........ | H04B 1/71632 |
| | | | 375/130 |
| 2010/0302181 A1* | 12/2010 | Kim ...................... | H04B 1/719 |
| | | | 345/173 |
| 2012/0163418 A1* | 6/2012 | Ward .................. | G01S 13/0209 |
| | | | 375/141 |
| 2015/0356332 A1* | 12/2015 | Turner ...................... | G01S 5/14 |
| | | | 340/10.5 |
| 2016/0337963 A1 | 11/2016 | Nabki et al. | |
| 2018/0175905 A1 | 6/2018 | Nabki et al. | |
| 2019/0256047 A1* | 8/2019 | Iwashita ............ | G01S 13/0209 |
| 2021/0166508 A1* | 6/2021 | Ziller ...................... | B60R 25/00 |

\* cited by examiner

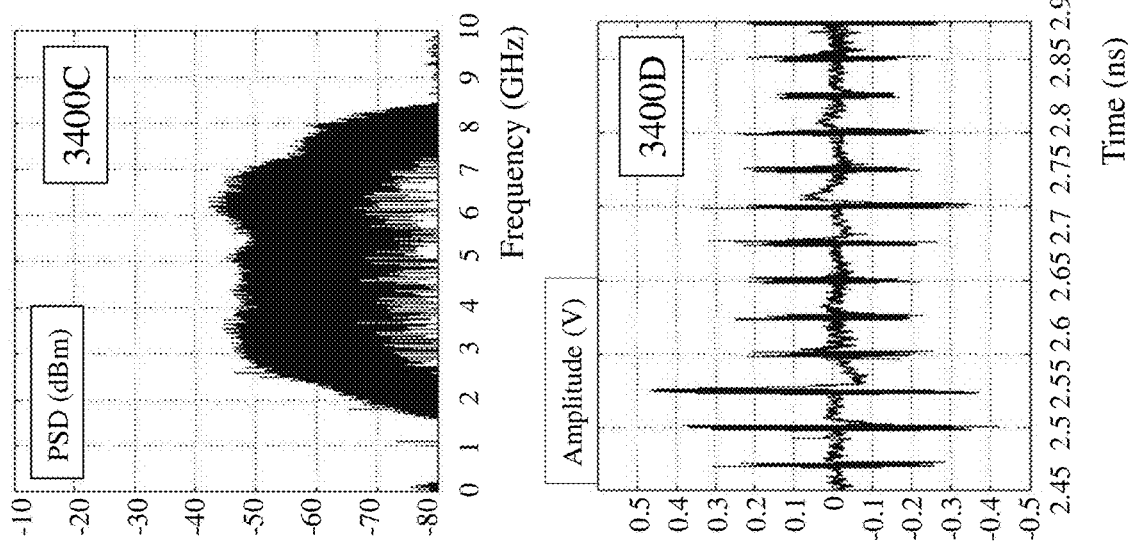
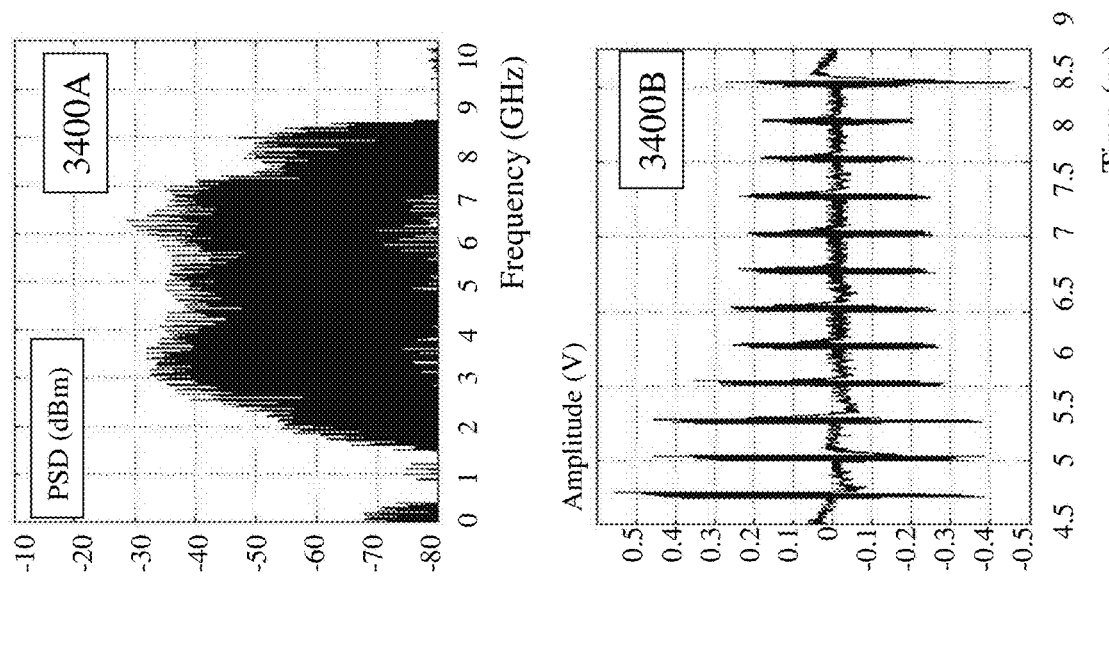
Figure 3F

SCK

CPOL=0
CPOL=1

SS

CPHA=0

| Cycle # | 1 | 2 | 3 | 4 | 5 | 6 | 7 | 8 |
| MISO | z | 1 | 2 | 3 | 4 | 5 | 6 | 7 | z |
| MOSI | z | 1 | 2 | 3 | 4 | 5 | 6 | 7 | z |

CPOL    Clock Polarity
SCK     Serial Clock (output from master)
MOSI    Master Out Slave In (data output from master)
MISO    Master In Slave Out (data output from slave)
SS      Slave Select 0b1010100111010001011010011101000101101001011101000101

1010011101000101101001110100010110100101110100010101

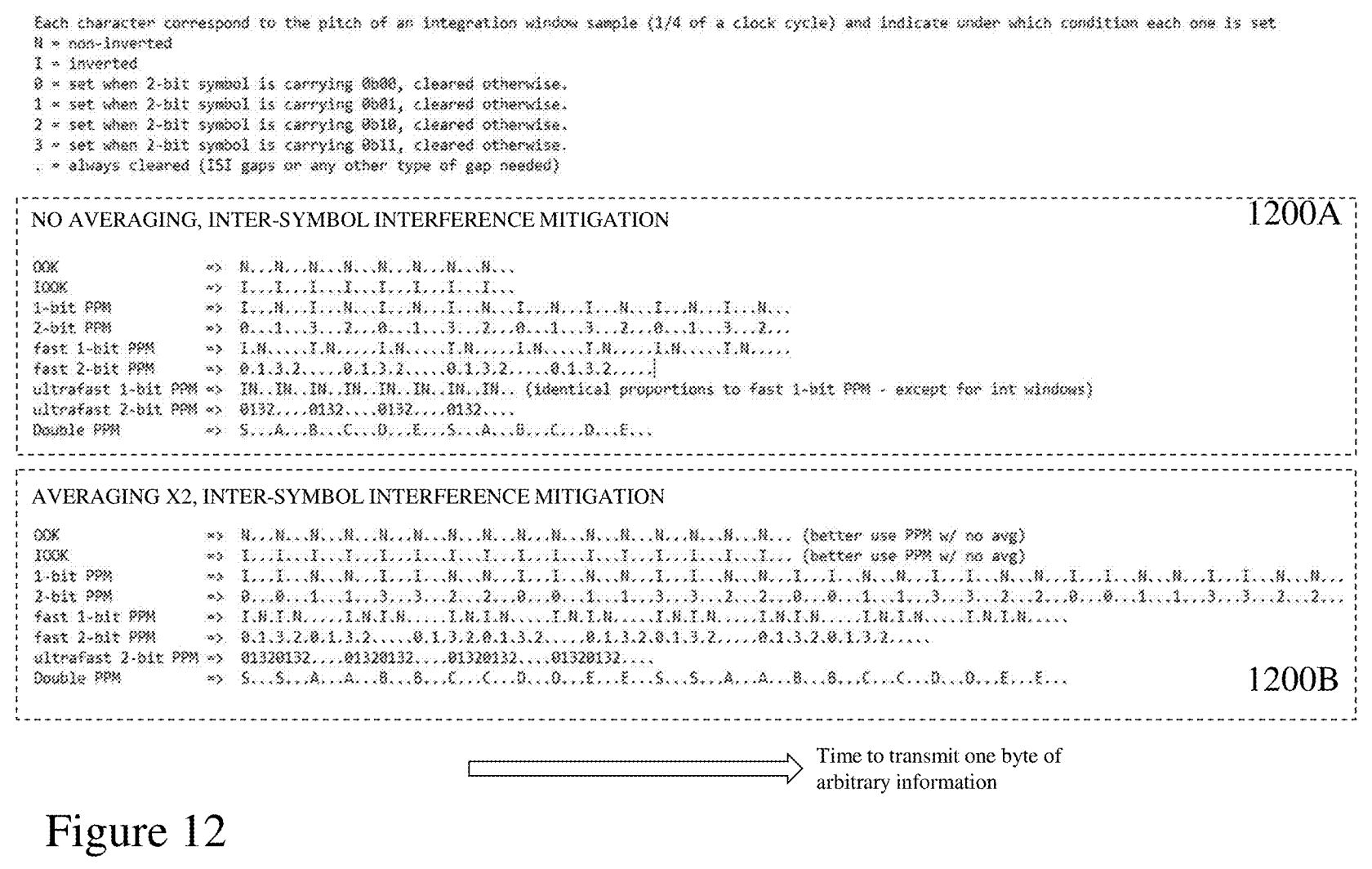

Each character corresponds to the pitch of an integration window sample (1/4 of a clock cycle) and indicate under which condition each one is set M = non-inverted
I = inverted
0 = set when 2-bit symbol is carrying 0b00, cleared otherwise.
1 = set when 2-bit symbol is carrying 0b01, cleared otherwise.
2 = set when 2-bit symbol is carrying 0b10, cleared otherwise.
3 = set when 2-bit symbol is carrying 0b11, cleared otherwise.
. = always cleared (ISI gaps or any other type of gap needed)

1200A

NO AVERAGING, INTER-SYMBOL INTERFERENCE MITIGATION

OOK        => M...M...M...M...M...M...
100K       => I...I...I...I...I...I...
1-bit PPM  => I...M...I...M...I...M...I...M...
2-bit PPM  => 0...1...3...2...0...1...3...2...
fast 1-bit PPM  => I.M...I.M...I.M...I.M...
fast 2-bit PPM  => 0.1.3.2...0.1.3.2...0.1.3.2...
ultrafast 1-bit PPM => IM..IM..IM..IM..IM..IM.. (identical proportions to fast 1-bit PPM - except for int windows)
ultrafast 2-bit PPM => 0132....0132....0132....
Double PPM => S...A...B...C...D...E...S...A...B...C...D...E...

1200B

AVERAGING X2, INTER-SYMBOL INTERFERENCE MITIGATION

OOK        => M...M...M...M...M...M...M...M...M...M... (better use PPM w/ no avg)
100K       => I...I...I...I...I...I...I...I...I...I... (better use PPM w/ no avg)
1-bit PPM  => I...M...I...M...I...M...I...M...I...M...
2-bit PPM  => 0...1...3...2...0...1...3...2...0...1...3...2...
fast 1-bit PPM  => I.M.I.M.....I.M.I.M.....I.M.I.M.....
fast 2-bit PPM  => 0.1.3.2.0.1.3.2.....0.1.3.2.0.1.3.2.....
ultrafast 2-bit PPM => 01320132....01320132....01320132....
Double PPM => S...S...A...A...B...B...C...C...D...D...E...E...

Time to transmit one byte of
arbitrary information

Figure 12

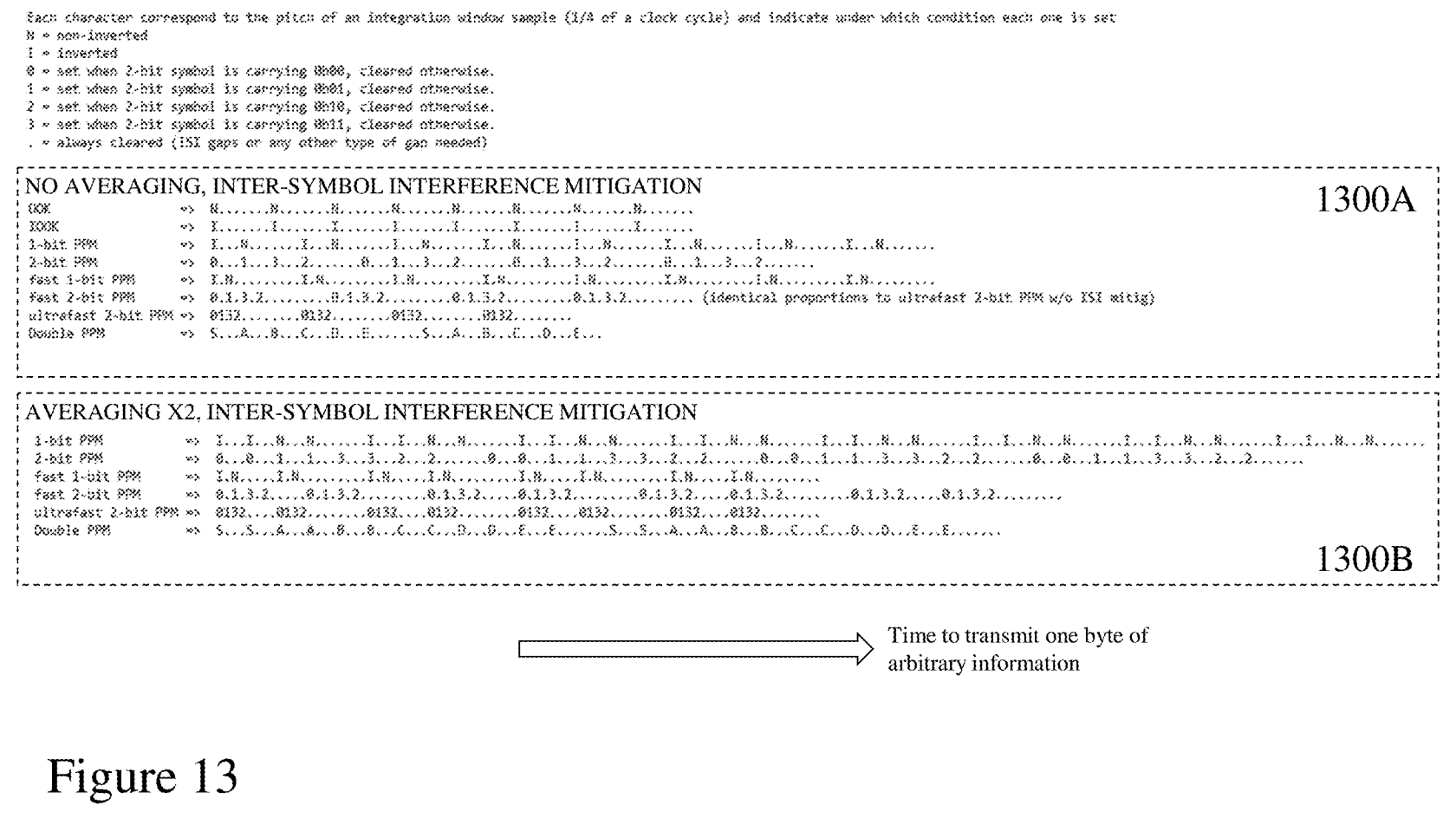

Each character correspond to the pitch of an integration window sample (1/4 of a clock cycle) and indicate under which condition each one is set N = non-inverted
I = inverted
0 = set when 2-bit symbol is carrying 8b00, cleared otherwise.
1 = set when 2-bit symbol is carrying 8b01, cleared otherwise.
2 = set when 2-bit symbol is carrying 8b10, cleared otherwise.
3 = set when 2-bit symbol is carrying 8b11, cleared otherwise.
. = always cleared (ISI gaps or any other type of gap needed)

NO AVERAGING, INTER-SYMBOL INTERFERENCE MITIGATION

NRZ
NRZI
1-bit PPM
2-bit PPM
fast 1-bit PPM
fast 2-bit PPM
ultrafast 2-bit PPM (identical proportions to ultrafast 2-bit PPM w/o ISI mitig)
Double PPM

1300A

AVERAGING X2, INTER-SYMBOL INTERFERENCE MITIGATION

1-bit PPM
2-bit PPM
fast 1-bit PPM
fast 2-bit PPM
ultrafast 2-bit PPM
Double PPM

1300B

Time to transmit one byte of arbitrary information

Figure 13

ULTRA WIDEBAND RADIO DEVICES AND METHODS

CROSS-REFERENCE TO RELATED APPLICATIONS

This patent application claims the benefit of priority as a 371 National Phase Entry application of PCT/CA2022/051510 filed Oct. 14, 2022; which itself claims the benefit of priority from U.S. Provisional Patent Application 63/255,813 filed Oct. 14, 2021; the entire contents of each being incorporated herein by reference.

FIELD OF THE INVENTION

This invention relates to ultra-wideband wireless radios and more particularly to configuring ultra-wideband transmitters, ultra-wideband receivers and ultra-wideband transceivers for enhanced ultra-wideband wireless link performance.

BACKGROUND OF THE INVENTION

Ultra-Wideband (UWB) technology is a wireless technology for the transmission of large amounts of digital data as modulated coded impulses over a very wide frequency spectrum with very low power over a short distance. Such pulse based transmission being an alternative to transmitting using a sinusoidal wave which is then turned on or off, to represent the digital states, as employed within today's wireless communication standards and systems such as IEEE 802.11 (Wi-Fi), IEEE 802.15 wireless personal area networks (PANs), IEEE 802.16 (WiMAX), Universal Mobile Telecommunications System (UMTS), Global System for Mobile Communications (GSM), General Packet Radio Service (GPRS), and those accessing the Industrial, Scientific and Medical (ISM) bands, and International Mobile Telecommunications-2000 (IMT-2000).

Accordingly, it would be beneficial for UWB transmitters, UWB receivers and UWB transceivers to exploit multiple directive antennas oriented in different directions to ensure spatial filtering of undesired signals and increase signal strength. It would be further beneficial for such multiple directive antennas to directly coupled to a balanced interface of the UWB transmitters, UWB receivers and UWB transceivers without requiring the integration of a balun between the UWB circuit and the antenna.

It would be further beneficial for UWB transmitters, UWB receivers and UWB transceivers to exploit one or more enhancements to support aspects such as:
- increased data rates to external wired interfaces;
- payloads with flexible encoding schemes;
- improved channel utilization;
- reduced processing logic;
- improved robustness in correlation techniques;
- versatile synchronisation techniques;
- improved ranging;
- inter-symbol interference (ISI) detection; and
- improved ISI tolerance.

Accordingly, it would be beneficial for UWB transmitters, UWB receivers and UWB transceivers to exploit improved pulse position modulation (PPM) schemes that offer enhanced tradeoffs with improved resolution of time of arrival of a pulse bundle used to transmit a bit within a UWB system according to an embodiment of the invention.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to ultra-wideband wireless radios and more particularly to configuring ultra-wideband transmitters, ultra-wideband receivers and ultra-wideband transceivers for enhanced ultra-wideband wireless link performance.

In accordance with an embodiment of the invention there is provided a method of providing an antenna comprising:
- providing a substrate;
- providing a first antenna structure operating over a predetermined frequency range formed upon a first surface of the substrate;
- providing a second antenna structure operating over the predetermined frequency range formed upon the first surface of the substrate;
- providing a ground plane disposed upon a second surface of the substrate distal to the first surface such that the first antenna structure and second structure are opposite the ground plane;
- providing a first feed structure electrically coupled to an end of the first antenna structure and a first input feed; and
- providing a second feed structure electrically coupled to an end of the second antenna structure and a second input feed, wherein
- the first feed structure and second feed structure are fed with a pair of differential outputs of an RF circuit;
- the antenna exhibits a dipole-like radiation pattern; and
- the antenna operates with linear polarization.

In accordance with an embodiment of the invention there is provided a method comprising:
- determining whether an integrated energy is detected within a period of a decision making circuit with respect to received symbols;
- upon a positive determination subtracting a predetermined portion of the integrated energy within the period from a next integrated energy for a next period of the decision making circuit to establish a corrected integrated energy; and
- making a decision with respect to whether a symbol is received with the decision making circuit in dependence upon the corrected integrated energy.

In accordance with an embodiment of the invention there is provided a method comprising:
- providing an integrator for integrated received wireless signals which integrates received energy for a symbol period;
- receiving a predetermined number N of symbols transmitted from a wireless transmitter to provide the received wireless signals where each symbol of the predetermined number N of symbols is the same;
- averaging the output of the integrator for the received number N of symbols to establish an average integrator output for the symbol; and
- determining the symbol with a decision making circuit which receives the average integrator output for the symbol.

In accordance with an embodiment of the invention there is provided a method comprising: establishing a serial peripheral interface (SPI) between a master and a slave; and switching a master input slave output (MISO) signal upon every half clock cycle rather than each clock cycle; wherein the SPI operates at an increased data rate.

In accordance with an embodiment of the invention there is provided a method comprising:

providing a data buffer comprising a circular first-in first-out (FIFO) buffer, a read pointer and a write pointer where the read pointer points to a beginning of a payload; and establishing a shadow pointer where the shadow pointer points to a beginning of another payload when the another payload is written to the FIFO; wherein a transmitter for transmitting data from the FIFO can conditionally choose which of the two immediately available payloads.

In accordance with an embodiment of the invention there is provided a method comprising:

receiving a frame of data from a wireless radio upon another wireless radio;

immediately starting to transmit a preamble of an auto-reply message with the wireless transceiver after receipt of the frame of data;

processing the received frame of data;

determining whether the auto-reply frame should not be sent in dependence upon the processing of the received frame of data;

upon determining the auto-reply frame should not be sent terminating the transmission of the preamble; and upon determining the auto-reply frame should be sent continuing to transmit the preamble and the remainder of the auto-replay frame.

In accordance with an embodiment of the invention there is provided a method comprising:

adjusting a gain of an automatic gain control loop of a wireless radio;

receiving data from another wireless radio within a listening period; wherein the gain of the automatic gain control loop cannot be increased during the listening period;

the gain of the automatic gain control loop can be decreased during the listening period; and gain of the automatic gain control loop at the end of the listening period is employed as an indicator of the peak energy level of wireless signals received from the another wireless radio during the listening period.

In accordance with an embodiment of the invention there is provided a method comprising:

retrieving from a memory a synchronization word;

generating three synchronisation sub-words from the synchronization word;

generating a new synchronization word from the synchronization word and the three synchronisation sub-words; and employing the new synchronization word to synchronize a wireless radio; wherein the synchronization word and the three synchronization sub-words can be combined in any order;

the first synchronization sub-word is the synchronization word inverted but not flipped;

the second synchronization sub-word is the synchronization word flipped but not inverted; and the third synchronization sub-word is the synchronization word flipped and inverted; and the synchronization word is not symmetrical or close to symmetrical.

In accordance with an embodiment of the invention there is provided a method comprising:

detecting in a receiver a preamble pattern comprising a repeating preamble of S bits with a decision making circuit which comprises R integration windows per clock cycle;

providing a set of M accumulators forming part of a preamble detection circuit of the receiver;

adding new samples to the set of M accumulators; wherein for each new sample added to an accumulator of the set of M accumulators a fraction X of the previous accumulated value is subtracted whilst the new sample is added;

$M = S \times R$; and the fraction X is $\frac{1}{2}^N$ where N is a positive integer.

In accordance with an embodiment of the invention there is provided a method comprising:

providing a soft correlation circuit which computes a soft correlation between a received signal and a synchronization word pattern in dependence upon a full value of a receiver sample having a length of the synchronization word pattern;

providing a hard correlation circuit which computes a hard correlation between the received signal and the synchronization word pattern where a bit threshold is first used to determine the symbol for each receiver sample having a length of a symbol before computing a correlation per bit; and determining that the synchronization word has been received if the received signal meets the correlation thresholds of both the soft correlation circuit and the hard correlation circuit.

In accordance with an embodiment of the invention there is provided a method comprising:

establishing a ranging process upon a wireless radio to establish a range to another wireless radio; wherein the ranging process employs phase data; and the phase data comprises initial phase data relating to an initial frame received from the another wireless radio and final phase data relating to an auto-reply frame received by the another wireless radio.

In accordance with an embodiment of the invention there is provided a method comprising:

providing a set of M accumulators forming part of a preamble detection circuit of a receiver receiving wireless signals to detect a predetermined preamble pattern;

determining in dependence upon the values within the set of M accumulators whether inter-symbol interference is present within the received wireless signals.

In accordance with an embodiment of the invention there is provided a method comprising:

transmitting a pulse bundle each clock cycle of a plurality of clock cycles;

adjusting for every other clock cycle of the plurality of clock cycles the position in time of the time bundle by a predetermined amount; wherein the predetermined amount can be set to mitigate inter-symbol interference effects.

In accordance with an embodiment of the invention there is provided a method comprising:

encoding data to be transmitted according to a modulation protocol; wherein the modulation protocol is an N-bit pulse position modulation protocol; and a pitch between the pulse positions is $\frac{1}{2}$ of a clock cycle.

In accordance with an embodiment of the invention there is provided a method comprising:

encoding data to be transmitted according to a modulation protocol; wherein the modulation protocol is an N-bit pulse position modulation protocol; and a pitch between the pulse positions is ¼ of a clock cycle.

In accordance with an embodiment of the invention there is provided a method of providing an antenna comprising:

providing a substrate;

providing a first antenna structure operating over a predetermined frequency range formed upon a first surface of the substrate;

providing a second antenna structure operating over the predetermined frequency range formed upon the first surface of the substrate;

providing a first feed structure electrically coupled to an end of the first antenna structure and a first input feed comprising a first electrical switch;

providing a second feed structure electrically coupled to an end of the second antenna structure and a second input feed comprising a second electrical switch; wherein the antenna operates selectively in a first mode, a second mode and a third mode;

in the first mode the first electrical switch connects the end of the first antenna structure to the first input feed and the second electrical switch connects the end of the second antenna structure to the second input feed such that the antenna operates in a concurrent polarization diverse operation mode with the first antenna operating in a first polarisation concurrently with the second antenna which operates in a second polarisation orthogonal to the first polarisation;

in the second mode the first electrical switch connects the end of the first antenna structure to the first input feed and the second electrical switch disconnects the end of the second antenna structure from the second input feed such that the antenna operates in the first polarisation; and in the third mode the first electrical switch disconnects the end of the first antenna structure from the first input feed and the second electrical switch connects the end of the second antenna structure to the second input feed such that the antenna operates in the second polarisation.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 3F depicts a pulse sequence for a bit transmitted by a UWB transmitter according to an embodiment of the invention together with its emitted power spectrum with and without biphasic phase scrambling;

FIGS. 12 and 13 depict exemplary transmission sequences for different combinations of PPM encoding schemes according to embodiments of the invention with different values of symbol redundancy to increase signal to noise ratio;

DETAILED DESCRIPTION

The present invention is directed to ultra-wideband wireless radios and more particularly to configuring ultra-wideband transmitters, ultra-wideband receivers and ultra-wideband transceivers for enhanced ultra-wideband wireless link performance.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

0. Impulse Radio Ultra Wideband System

As discussed supra UWB offers many potential advantages such as high data rate, low-cost implementation, and low transmit power, ranging, multipath immunity, and low interference. However, due to low emission levels permitted by regulatory agencies such UWB systems tend to be short-range indoor applications but it would be evident that a variety of other applications may be considered where such regulatory restrictions are relaxed and/or not present addressing military and civilian requirements for communications between individuals, electronic devices, control centers, and electronic systems for example.

Figure 1:
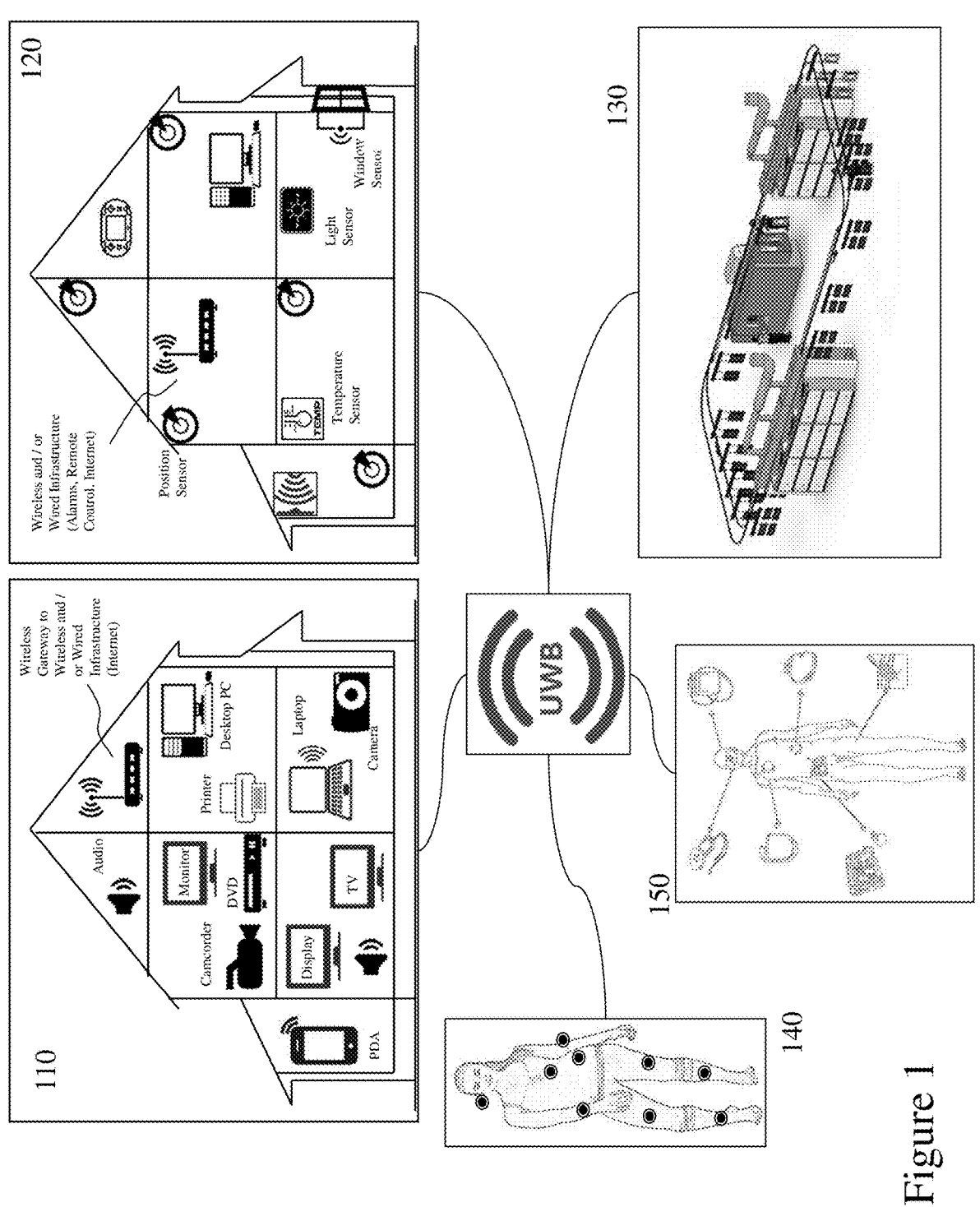
FIG. 1 depicts applications of UWB transmitters, receivers, and systems according to embodiments of the invention.

Accordingly, UWB systems are well-suited to short-distance applications in a variety of environments, such as depicted in FIG. 1 including peripheral and device interconnections, as exemplified by first Residential Environment 110, sensor networks, as exemplified by second Residential Environment 120, control and communications, as exemplified by Industrial Environment 130, Medical Systems 150, and personal area networks (PAN), as exemplified by PAN 140. For example, with PAN 140 a user may have associated with them, for example worn discretely, implanted or within an item of smart clothing etc. a variety of sensors including, but not limited to, those providing acoustic environment information via MEMS microphone, user breathing analysis through lung capacity sensor, global positioning via GPS sensor, their temperature and/or ambient temperature via thermometer, and blood oxygenation through pulse oximeter. These are augmented by exertion data acquired by muscle activity sensor, motion data via 3D motion sensor (e.g. 3D accelerometer), user weight/carrying data from pressure sensor and walking/running data from a pedometer. These may be employed in isolation or in conjunction with other data including, for example, data acquired from medical devices associated with the user such as depicted in Medical Systems 150. As depicted these medical devices may include, but are not limited to, deep brain neurostimulators/implants, cochlear implant, cardiac defibrillator/pacemaker, gastric stimulator, insulin pump, and foot implants.

The Federal Communications Commission (FCC) regulations for UWB reserved the unlicensed frequency band between 3.1 GHz and 10.6 GHz for indoor UWB wireless communication system wherein the low regulated transmitted power allows such UWB systems to coexist with other licensed and unlicensed narrowband systems. Therefore, the limited resources of spectrum can be used more efficiently. On the other hand, with its ultra-wide bandwidth, an UWB system has a capacity much higher than the current narrowband systems for short range applications. Two possible techniques for implementing UWB communications are Impulse Radio (IR) UWB and multi-carrier or multi-band (MB) UWB. IR-UWB exploits the transmission of ultra-short (of the order of nanosecond) pulses, although in some instances in order to increase the processing gain more than one pulse represents a symbol. In contrast MB-UWB systems use orthogonal frequency division multiplexing (OFDM) techniques to transmit the information on each of the sub-bands. Whilst OFDM has several good properties, including high spectral efficiency, robustness to RF and multi-path interferences. However, it has several drawbacks such as up and down conversion, requiring mixers and their associated high power consumption, and is very sensitive to inaccuracies in frequency, clock, and phase. Similarly, nonlinear amplification destroys the orthogonality of OFDM. Accordingly, MB-UWB is not suitable for low-power and low cost applications.

In contrast IR-UWB offers several advantages, including unlicensed usage of several gigahertz of spectrum, offers great flexibility of spectrum usage, and adaptive transceiver designs can be used for optimizing system performance as a function of the data rate, operation range, available power, demanded quality of service, and user preference. Further, multi-Gb/s data-rate transmission over very short range is possible and due to the ultra-short pulses within IR-UWB it is very robust against multipath interference, and more multipath components can be resolved at the receiver in some implementations, resulting in higher performance. Further, the ultra-short pulses support sub-centimeter ranging whilst the lack of up and down conversion allows for reduced implementation costs and lower power transceiver implementations. Beneficially, ultra-short pulses and low power transmissions make IR-UWB communications hard to eavesdrop upon.

An IR-UWB transmitter as described below in respect of embodiments of the invention in with reference to FIGS. 2 and 3 respectively exploits an on-demand oscillator following a pulse generator in order to up-convert the pulses from the pulse generated whilst avoiding the requirement of a separate mixer. Implementable in standard CMOS logic both the pulse generator and the on-demand oscillator are digitally tunable in order to provide control over the pulse bandwidth and center frequency. Further, by exploiting a digitally controlled ring oscillator for the on-demand oscillator the IR-UWB transmitter is designed to allow very quick frequency adjustments on the order of the pulse repetition rate (PRR). Beneficially this technique provides the same advantages as MB-OFDM in respect of spectrum configurability, achieved by sequentially changing the transmitted spectrum using a frequency hopping scheme, whilst maintaining the benefits of IR-UWB. Further, by providing advanced duty cycling with fast power up time combined with On-Off Shift Keying (OOK) modulation the IR-UWB according to embodiments of the invention allows significant reductions in power consumption by exploiting the low duty cycle of a UWB symbol and the fact that only half the symbols require sending energy.

In addition to defining the operating frequency range for UWB systems the different regulatory bodies all specify and enforce a specific power spectral density (PSD) mask for UWB communications. A PSD mask as may be employed in respect of embodiments of the invention is the FCC mask for which mask data are summarized in Table 1 below for the 3100 MHz-10600 MHz (3.1 GHz-10.6 GHz) range.

| Frequency Range | Indoor EIRP Limit (dBm/MHz) | Outdoor EIRP Limit (dBm/MHz) |
|---|---|---|
| <960 | −49.2 | −49.2 |
| 960-1610 MHz | −75.3 | −75.3 |
| 1610-1990 MHz | −53.3 | −63.3 |
| 1990-3100 MHz | −51.3 | −61.3 |
| 3100-10600 MHz | −41.3 | −41.3 |
| >10600 MHz | −51.3 | −61.3 |

Table 1: FCC Masks for Indoor-Outdoor for Different Frequency Bands

Accordingly, it would be evident that the upper limit of −41.3 dB/MHz across the 3.1 GHz-10.6 GHz frequency range is the same limit imposed on unintentional radiation for a given frequency in order not to interfere with other radios. Basically, for a given frequency, the UWB radio operates under the allowed noise level which creates the relationship presented in Equation (1) between $E_p$, the transmitted energy per pulse, the maximum spectral power S, the bandwidth B, the bit rate $R_b$ and the number of pulses per bits $N_{ppb}$.

$$E_p \cdot N_{ppb} \cdot R_b \le S \cdot B \qquad (1)$$

The IEEE has published a few standards for a physical layer (PHY) for UWB radio in Personal Area Networks (IEEE 802.15.4a-2007), Body Area Networks (IEEE 802.15.4a-2007) and Radio-Frequency Identification (IEEE 802.15.4f-2012). These standards use mostly relatively large pulses resulting in relatively narrow bandwidth which is up-converted to a specific center frequency in order to fill predetermined channels. The data is encoded using pulse-position-modulation (PPM) and bi-phasic shift keying (BPSK) is used to encode redundancy data. Every bit consists of one or more pulses scrambled in phase depending on the target data rate. These standards allow considerable flexibility on channel availability and data rates. The standard also defines the preamble, headers for the data packet and ranging protocol.

These IEEE standards are designed with multiple users in mind and use different channels to transmit the data, thereby putting a heavy constraint on pulse bandwidth and limiting the transmitted energy. Prior art on non-standard transmitter attempts to make better use of the available spectrum by using narrow pulses, which therefore have a larger bandwidth thereby increasing the maximum transmitted energy according to Equation (1). Accordingly, these transmitters are non-standard and were also designed for different data rates, frequencies, pulse width, etc. Additionally, they also used various encoding schemes, most notably PPM, OOK or BPSK.

Within the work described below the inventors have established improvements with respect to UWB systems, UWB transmitters and energy based UWB receivers which are capable of generating and adapting to a variety of IR-UWB pulses and bit encoding schemes thereby support-ing communications from both IR-UWB transmitters com-pliant to IEEE standards as well as those that are non-standard. These improvements are made with respect to UWB transmitters, UWB receivers, UWB transceivers and UWB systems such as those described and depicted by the inventors within WO/2015/103,692 "Systems and Methods Relating to Ultra-Wideband Broadcasting comprising Dynamic Frequency and Bandwidth Hopping" (PCT/CA2015/000,007, filed Jan. 7, 2015); WO/2016/191,851 "Systems and Methods for Spectrally Efficient and Energy Efficient Ultra-Wideband Impulse Radios with Scalable Data Rates" (PCT/CA2016/000,161 filed May 31, 2016); WO/2019/000,075 "Energy Efficient Ultra-Wideband Impulse Radio Systems and Methods" (PCT/CA2018/000,135 filed Jun. 29, 2018); WO/2020/186,332 "Methods and Systems for Ultra-Wideband (UWB) Receivers" (PCT/CA2020/000,029 filed Mar. 18, 2020); WO/2020/186,333 "Ultra-Wideband (UWB) Transmitter and Receiver Cir-cuits" filed Mar. 18, 2020; and WO/2020/186,334 "Ultra-Wideband (UWB) Link Configuration Methods and Sys-tems" filed Mar. 18, 2020.

1. IR-UWB Transmitter Circuit

Figures 2, 3A:
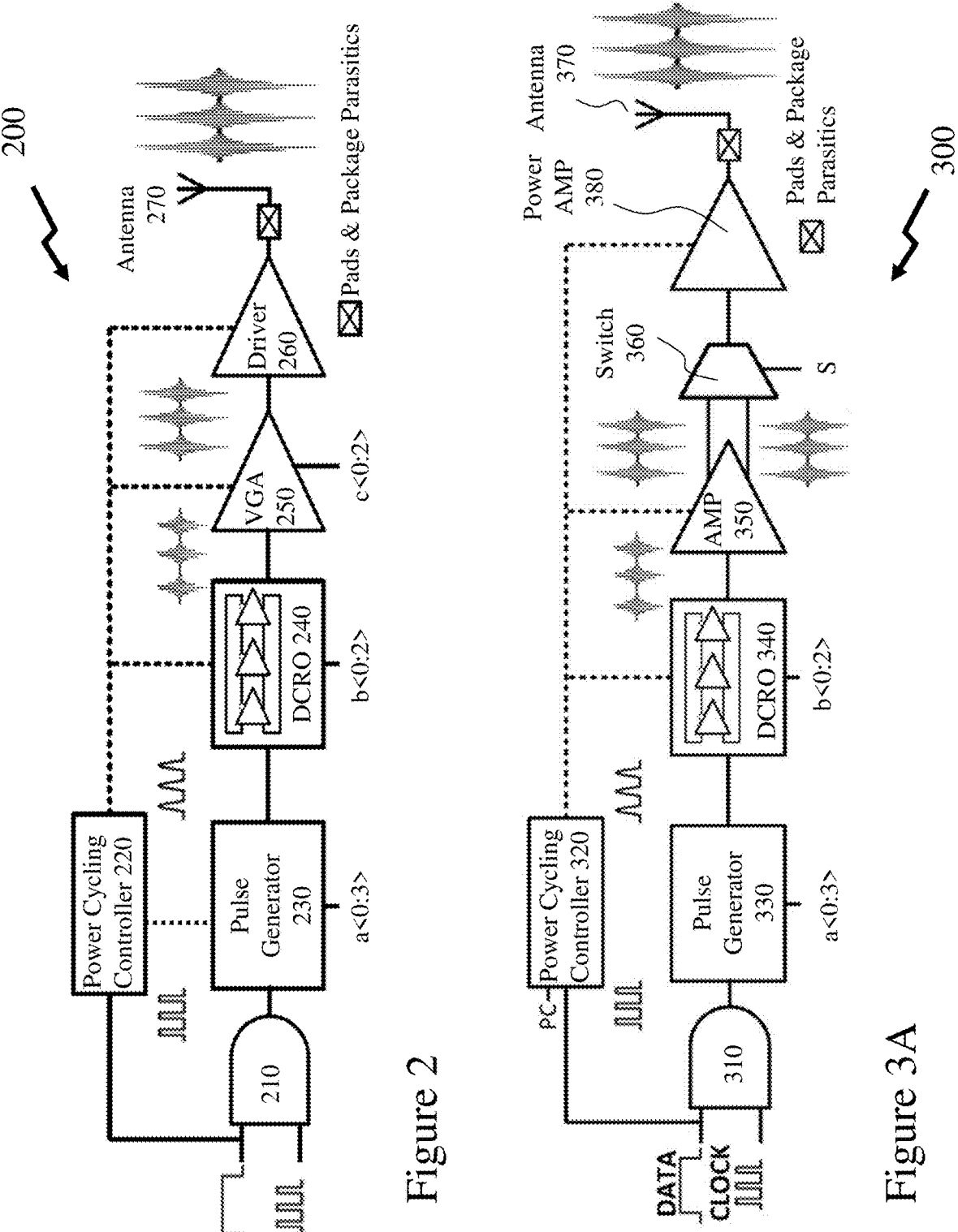
FIG. 2 depicts a block diagram of a UWB transmitter according to an embodiment of the invention.
FIG. 3A depicts a block diagram of a UWB transmitter according to an embodiment of the invention supporting biphasic phase scrambling.

Referring to FIG. 2 there is depicted schematically an exemplary architecture for an IR-UWB transmitter 200 according to embodiments of the invention which is com-posed of five main blocks plus the antenna. First a program-mable impulse is produced by a pulse generator 230 at clocked intervals when the data signal from AND gate 210 is high based upon control signals presented to the AND gate 210. The pulses from the pulse generator 230 are then up-converted with a programmable multi-loop digitally con-trolled ring oscillator (DCRO) 240. The output from the DCRO 240 is then coupled to a variable gain amplifier (VGA) 250 in order to compensate for any frequency dependency of the pulse amplitude. Finally, a driver 260 feeds the antenna 270, overcoming typical package parasit-ics, such as arising from packaging the transceiver within a quad-flat no-leads (QFN) package. In order to further reduce the power consumption of the IR-UWB transmitter (IR-UWB-Tx) 200 according to embodiments of the invention a power cycling controller 220 dynamically switches on or off these functional blocks when the data signal is low.

Now referring to FIG. 3A there is depicted schematically a block diagram 300 of an exemplary IR-UWB transmitter according to embodiments of the invention supporting biphasic phase scrambling. In comparison to the IR-UWB transmitter 200 in FIG. 2 for an IR-UWB according to embodiments of the invention without biphasic phase shift-ing rather than being composed of five main blocks plus the antenna the Biphasic Phase Shifting IR-UWB (BPS-IR-UWB) transmitter comprises 6 main blocks. First a pro-grammable impulse is produced by a pulse generator 330 at clocked intervals when the data signal from AND gate 310 is high based upon control signals presented to the AND gate 310. The pulses from the pulse generator 330 are then up-converted with a programmable multi-loop digitally con-trolled ring oscillator (DCRO) 340. The output from the DCRO 340 is then coupled to a dual-output amplifier (VGA) 350 both in order to compensate for any frequency depen-dency of the pulse amplitude but also to generate dual phase shifted output signals that are coupled to a switch 360 which selects one of the two signals to couple to the output power amplifier (driver) 380 under the action of the switch control signal "S" applied to the switch 360. Note that a similar phase selection scheme could be implemented by affecting the startup conditions for DCRO 340 in order to provide the two phases. This would preclude the need for switch 360 at the cost of an added control startup condition control signal on DCRO 340.

The output power amplifier 380 feeds the antenna 370, overcoming typical package parasitics, such as arising from packaging the transceiver within a quad-flat no-leads (QFN) package. In order to reduce the power consumption of the BPS-IR-UWB transmitter represented by block diagram 300 according to an embodiment of the invention a power cycling controller 320 dynamically switches on or off these functional blocks when the data signal "PC" is low. Accord-ingly, a BPS-IR-UWB transmitter according to embodi-ments of the invention transmits pulses with or without phase shift based upon the control signal "S" applied to switch 360. If this control signal is now fed from a random data generator or a pseudo-random data generator then the resulting pulses coupled to the antenna of the BPS-IR-UWB transmitter will be pseudo-randomly or randomly phase shifted.

Figures 3B, 3C:
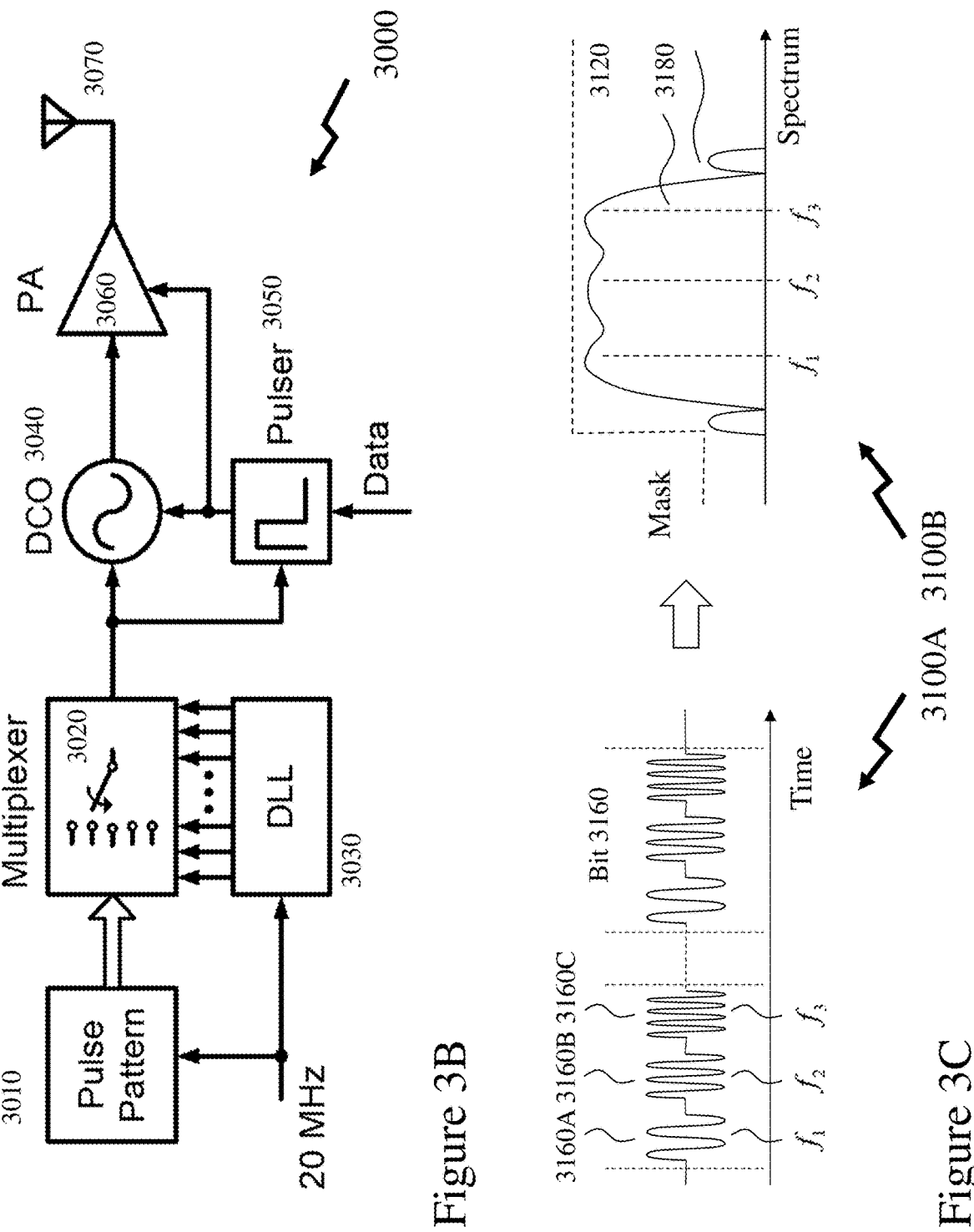
FIG. 3B depicts a block diagram of a UWB transmitter according to an embodiment of the invention employing dynamically configurable and programmable pulse sequences.
FIG. 3C depicts schematically a multi-pulse symbol UWB protocol according to an embodiment of the invention.

Now referring to FIG. 3B there is depicted schematically a block diagram 3000 of an exemplary IR-UWB transmitter according to embodiments of the invention. As depicted a Pulse Pattern block 3010 holds a configuration for the pulses used to represent the current symbol. From the symbol-rate clock (i.e. 20 MHz), multiple phases are generated by a Delay Locked Loop (DLL) 3030. The rising edge of each clock phase represents the start of one pulse in the symbol pulse bundle. A multiplexer 3020 is triggered by the edges of the clock phases and selects the configuration of the current pulse out of the Pulse Pattern block 3010. A pulse generator (Pulser) 3050 generates pulses with a pulse width set by the multiplexer 3020 and enables the Digitally Controlled Oscillator (DCO) 3040 and Power Amplifier (PA) 3060. When enabled, the DCO 3040 generates a Gaussian shaped pulse with frequency set by the multiplexer 3020, which is then amplified by the PA 3060 and radiated by the antenna 3070.

Accordingly, the Pulse Pattern block 3010 establishes the pulses for a symbol or sequence of symbols. In this manner updating the Pulse Pattern block 3010 adjusts the pulse sequence employed for each symbol and accordingly the Pulse Pattern block 3010 may be dynamically updated based upon one or more factors including, but not limited to, network environment data, predetermined sequence, date, time, geographic location, signal-to-noise ratio (SNR) of received signals, and regulatory mask.

Referring to FIG. 3C there is depicted schematically a multi-pulse symbol UWB protocol according to an embodiment of the invention. Referring to first image 3100A there is depicted a bit 3160 comprising a series of sub-pulses 3160A to 3160C which are each at frequencies $f_1;f_2;f_3$. Accordingly, the multi-pulse spectrum 3180 of a symbol (bit 3160) is depicted in second image 3100B as obtained conceptually (phase scrambling is omitted for clarity) by summing the individual pulse spectra of the sub-pulses 3160A to 3160C, which increases the bandwidth whilst increasing the total symbol duration, in contrast with single-pulse prior art methods, whilst maintaining the maximum power below the UWB mask 3120. This allows the symbol energy to be maximized while relaxing the timing requirements and level of synchronisation required at the receiver. An arbitrary number of pulses with different sets of parameters may be included within a bundle to tailor the pulse spectrum to a given requirement.

Figures 3D, 3E:
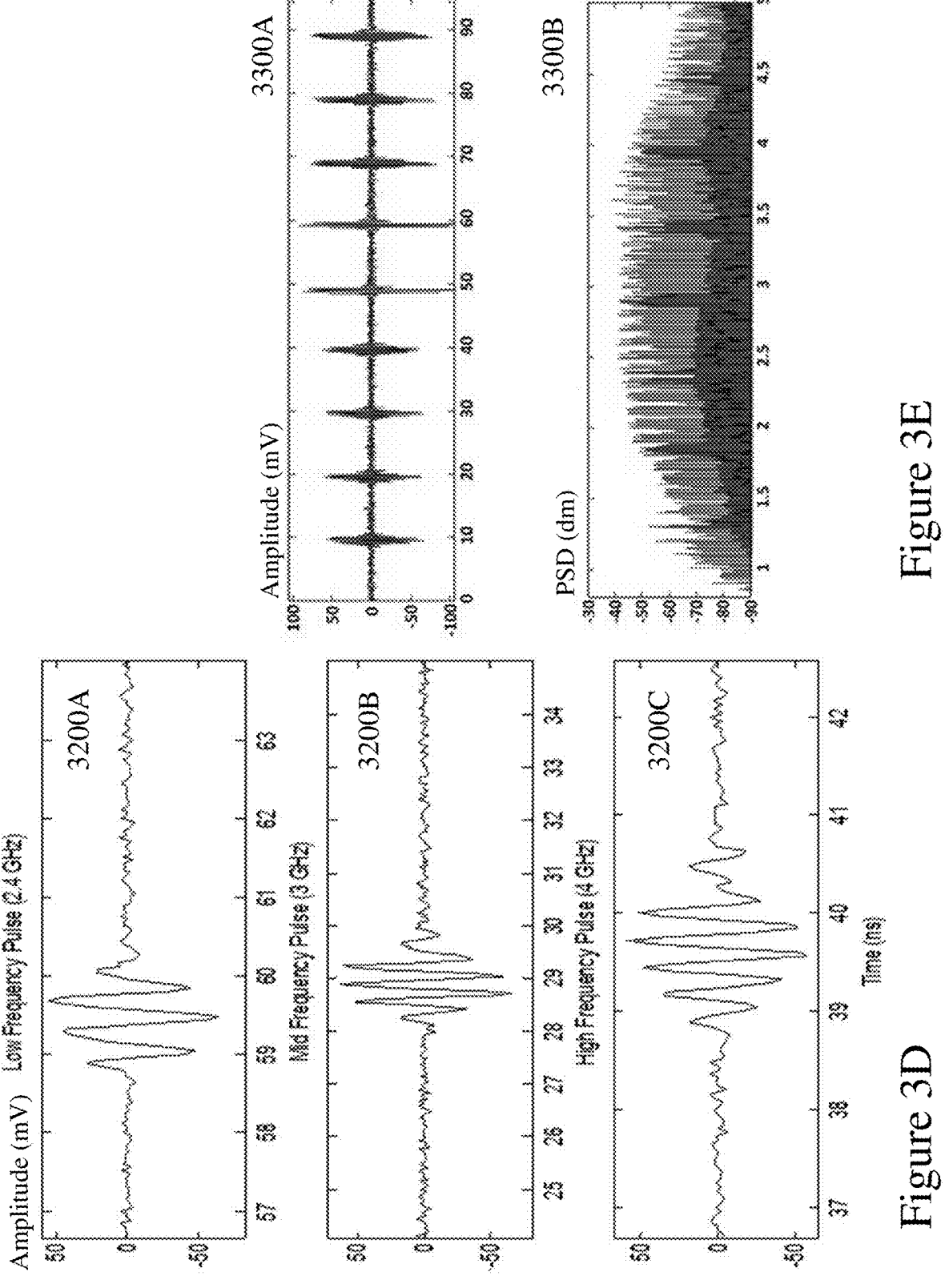
FIG. 3D depicts pulses from a UWB transmitter according to an embodiment of the invention at three different frequencies.
FIG. 3E depicts a pulse sequence for a bit transmitted by a UWB transmitter according to an embodiment of the invention together with its emitted power spectrum.

Now referring to FIG. 3D there are depicted the measured pulse shapes for three different frequency setting of a UWB transmitter according to an embodiment of the invention such as described and depicted in FIG. 2 or FIG. 3A without biphasic phase scrambling according to WO/2015/103,692. First to third traces 3200A to 3200C respectively representing single pulses at 2.4 Ghz, 3 GHz, and 4 GHz respectively.

Referring to FIG. 3E there is depicted in first trace 3300A a pulse bundle representing a bit being transmitted such as described within WO/2015/103,692 is depicted whilst second trace 3300B depicts the resulting power spectrum density (PSD). It is evident that this allows for managing the PSD of the final signal through the parameters for each pulse within the frequency hopping sequence. The pulse sequence depicted comprising 4 pulses at 2.4 GHz, 2 pulses at 3.5 GHz, and 3 pulses at 4.0 GHz. The resulting PSD fills the spectrum at around −58 dBm over the entire band.

Now referring to FIG. 3F there are depicted the power spectrum and pulse train for a pulse bundle according to WO 2016/191,851 and as depicted in FIG. 3A supporting operating over a frequency range from approximately 3 GHz to approximately 7 GHz. First and second images 3400A and 3400B respectively representing the power spectrum and pulse sequence wherein there is no random frequency or phase scrambling during the generation and transmission. Third and fourth images 3400C and 3400D depict the results for random frequency and random phase scrambling of the pulses wherein phase is set per pulse through data established by a pseudo-random data generator. Accordingly, it would be evident that when comparing first and third images 3400A and 3400C that the introduction of random frequency and random phase shifting reduces the spectral lines significantly within the emitted spectrum of a UWB transmitter according to embodiments of the invention.

2. IR-UWB Receiver

Figure 4:
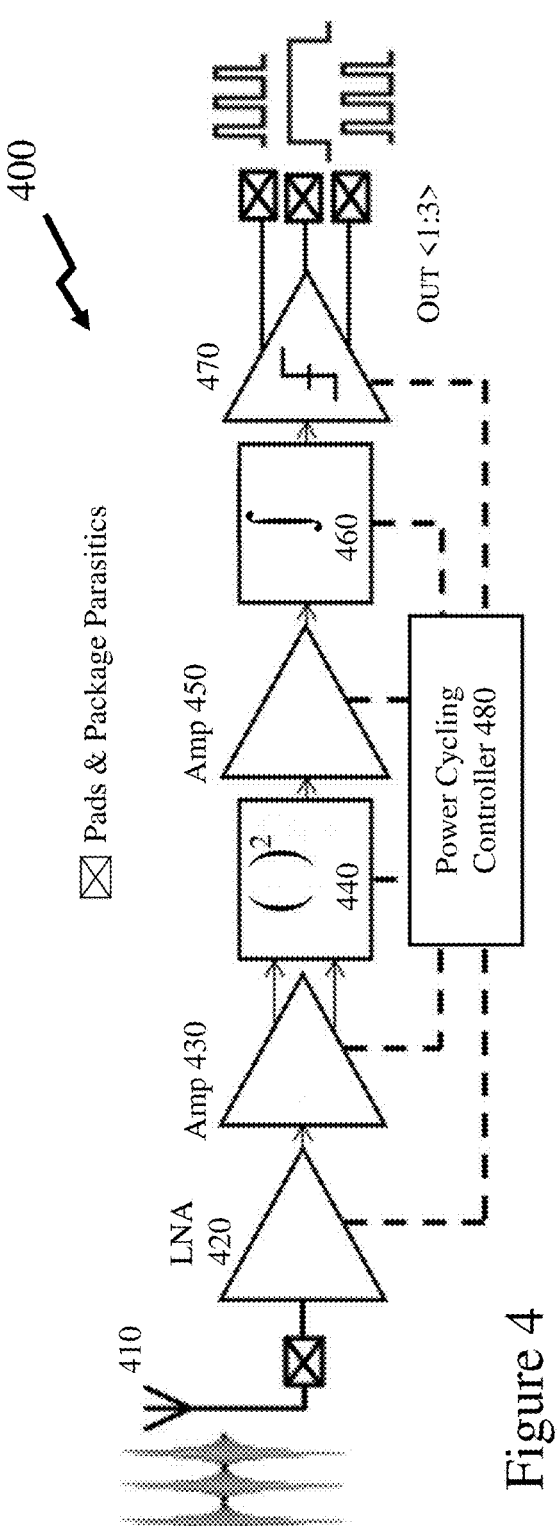
FIG. 4 depicts a block diagram of a UWB receiver according to an embodiment of the invention.

Referring to FIG. 4 there is depicted schematically the architecture of an IR-UWB receiver 400 according to embodiments of the invention. Accordingly, the signal from an IR-UWB transmitter is received via an antenna 410 and coupled to a low noise amplifier (LNA) 420 followed by first amplifier 430 wherein the resulting signal is squared by squaring circuit 440 in order to evaluate the amount of energy in the signal. The output of the squaring circuit 440 is then amplified with second amplifier 450, integrated with integration circuit 460 and evaluated by a flash ADC 470 to generate the output signals. Also depicted is Power Cycling Controller 480 which, in a similar manner to the power cycling controller 220 of IR-UWB transmitter 200 in FIG. 2, dynamically powers up and down the LNA 420, first and second amplifiers 430 and 450 respectively, squaring circuit 440, and flash ADC 470 to further reduce power consumption in dependence of the circuit's requirements.

Figure 5:
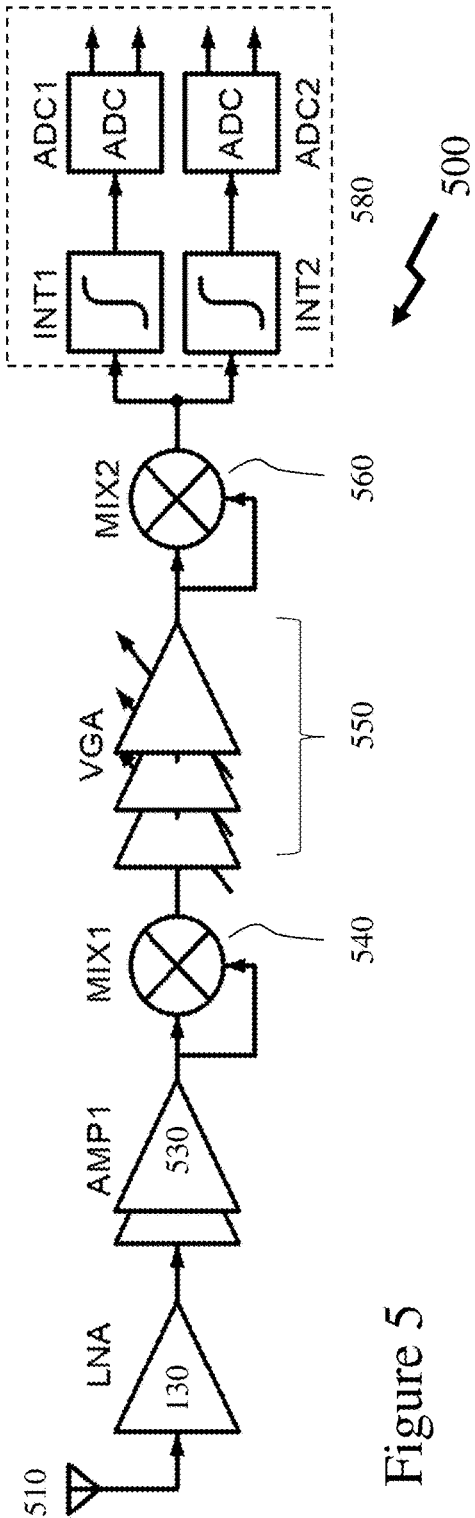
FIG. 5 depicts a receiver circuit schematic for a UWB receiver/transceiver according to an embodiment of the invention.

Referring to FIG. 5 there is depicted a schematic of a receiver 500 according to an embodiment of the invention. The RF signal from the antenna 510 is initially amplified by a Low Noise Amplifier (LNA) 520 before being passed to a two stage RF amplifier (AMP1) 530. A first squaring mixer (MIX1) 540 multiplies the signal with itself to convert to the Intermediate Frequency (IF). A three-stage Variable Gain Amplifier (VGA) 550 amplifies the signal further and implements a bandpass filter function. The VGA 550 output is then coupled to a second squaring mixer (MIX2) 560 which down-converts the signal to the baseband frequency. An energy detection circuit 580 comprising a parallel of integrator (INT1 and INT2) sums the signal energy, which is digitized by the Analog-to-Digital Converters (ADC1 and ADC2) and sent to a digital processor (not depicted for clarity).

3. IR-UWB Receiver

As described within WO/2019/000,075 and WO 2016/191,851 the inventors have established design parameters of millisecond range start-up time from sleep mode and microsecond range start-up time from idle mode by establishing a custom integrated DC/DC converter and duty cycled transceiver circuitry that enables fast circuit start-up/shut-down for optimal power consumption under low (1 kbps) and moderate data rates (10 Mbps).

Figure 6:
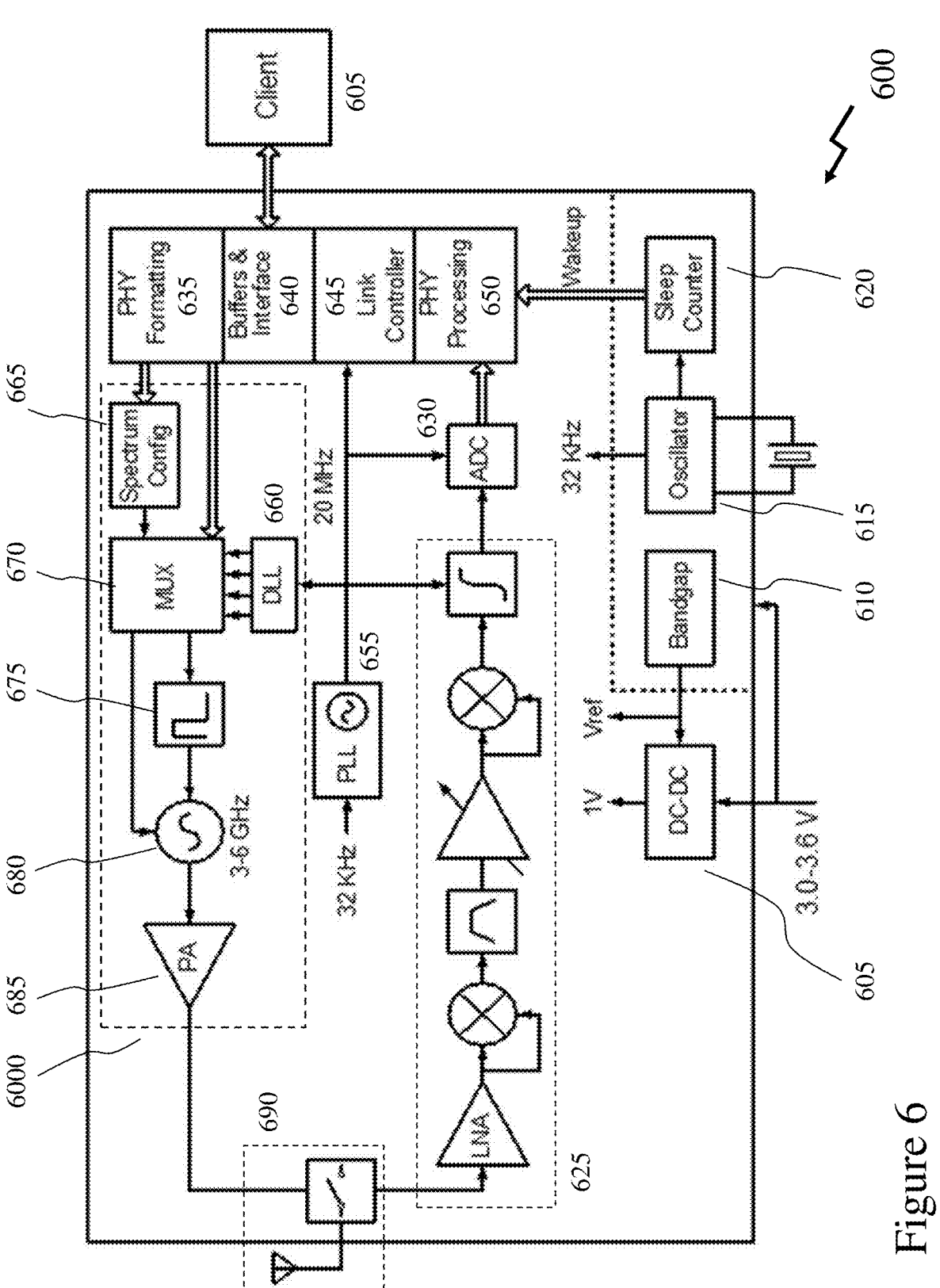
FIG. 6 depicts a circuit schematic for a UWB transceiver according to an embodiment of the invention.

In order to sustain good energy efficiency, the elements of a total UWB transceiver, such as depicted with transceiver 600 in FIG. 6 according to embodiments of the invention, has been designed for low static sleep current and fast startup/sleep times. Referring to FIG. 6, a battery $(3.0V \leq V_{BATT} \leq 3.6V)$ (not depicted for clarity) powers a low-frequency crystal oscillator 615, sleep counter 620 and bandgap reference 610, all of which are typically always operational although the bandgap reference 610 could be duty cycled within other embodiments of the invention without altering the scope of the claimed invention). Their power consumption limits the minimum power consumption of the system to sub-microwatt level. An integrated buck DC-DC converter 605 is powered by the battery when the system is not in sleep mode, and this provides the supply voltage to the rest of the system with high conversion efficiency. The startup time of the DC-DC converter 605 is on the order of several symbol periods in order to minimize wasted energy. Between sleep periods, the PLL 655 is active to provide the base clock for the system. The receiver 625 and DLL 660 have dedicated power down controls and are only activated during frame transmission/reception. Further, the transmitter is also power cycled through its all-digital architecture which is not depicted as having a separate control. The power consumption of the digital synthesized blocks is low due to the low base clock (e.g. 20 MHz).

In principle, a power-cycled transceiver achieves linear scaling of power consumption with data rate, thus achieving constant energy efficiency. With a fixed frame size, multiple data rates are obtained by adjusting the length of the sleep period, with the maximum attainable data rate determined by the symbol rate in the frame itself. In order to preserve energy efficiency, the power consumption during sleep must be lower than the average power consumption. For high data rates, powering down the PLL is not required when its consumption does not significantly degrade the overall efficiency. For low data rates, the whole system except the bandgap reference, crystal oscillator, and sleep counter can be shut down during sleep mode. In this case, the millisecond range startup time of the PLL can be insignificant compared to the sleep period, and overall efficiency is also not significantly degraded.

As depicted the UWB transceiver 600 also comprises a receive/transmit switch 690 coupled to the antenna to selectively couple the transmitter 6000 or receiver 625 to the antenna during transmission and reception respectively. The UWB transceiver 600 also comprises a spectrum configuration circuit 665 (equivalent to Pulse Pattern 3010 in transmitter 3000 in FIG. 3B), PHY Processing circuit 650, Link Controller 645, Buffer and Interface circuit 640, and PHY Formatting circuit 635. The UWB transceiver 600 communicates via Link Controller 645 to the Client 605. As such, Link Controller 645 may communicate using a wired protocol (e.g., serial peripheral interface (SPI)) to Client 605, for example.

4. Compact Dipole Antenna Diversity for UWB Systems

UWB transmitters, UWB receivers and UWB transceivers employ an antenna as a transducer between the wireless UWB signals and the electrical signals coupled to or generated by the UWB circuitry of a UWB transmitter, UWB receiver or UWB transceiver. Many antenna structures have been presented in the prior art for either discrete UWB antennas or UWB antennas supporting diversity techniques to help mitigate effects such as multipath interference.

Accordingly, the inventors have established previously compact antenna diversity structure to employ with UWB transmitters, UWB receivers and UWB transceivers exploiting techniques according to embodiments of the invention which are described and depicted within patent applications including WO/2015/103,692; WO/2016/191,851; WO/2019/000,075, WO/2020/186,332; WO/2020/186,333, and WO/2020/186,334, together with other aspects of these UWB devices not described here or elsewhere.

Figure 7:
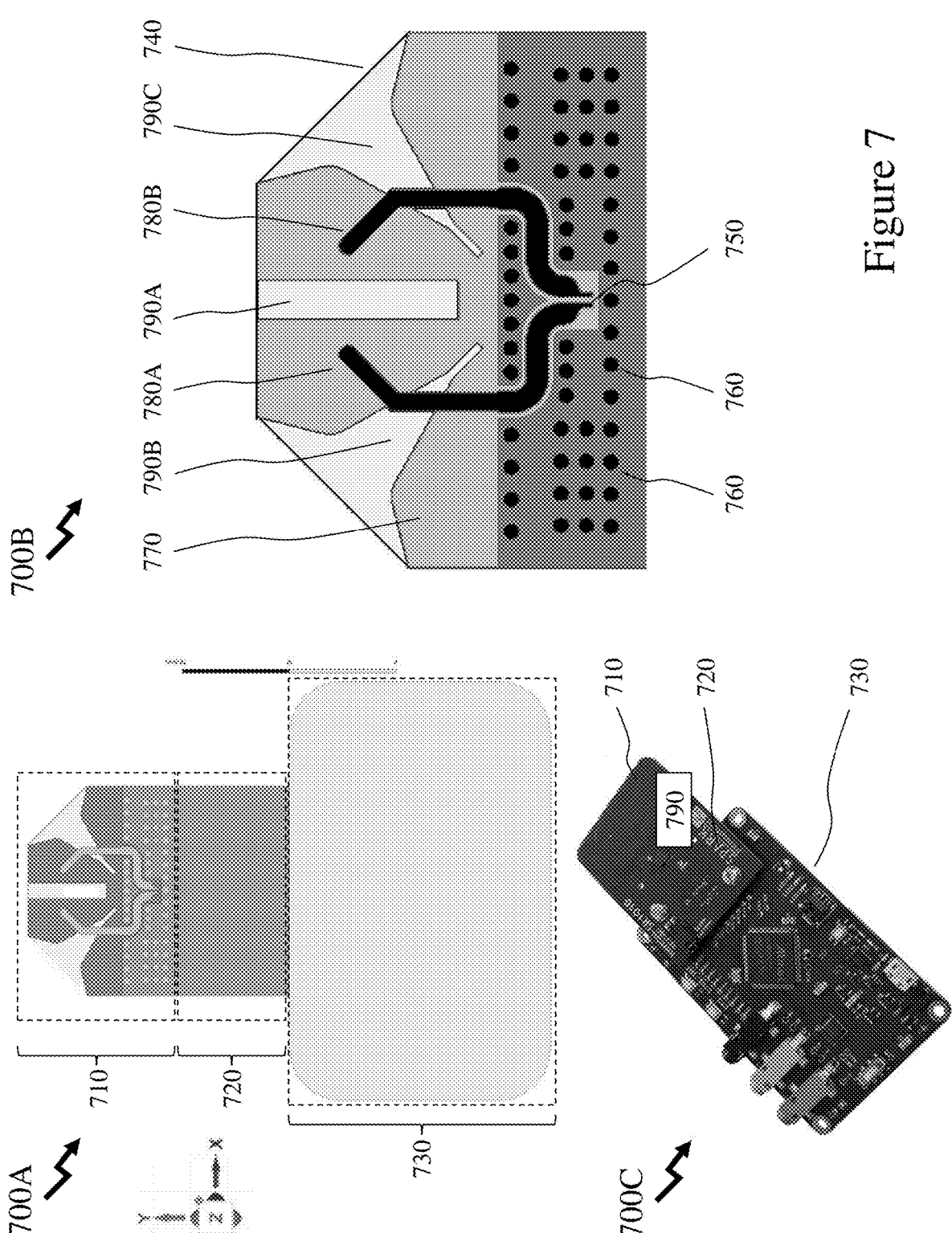
FIG. 7 depicts a compact diverse dipole antenna according to an embodiment of the invention.

However, there still exists the requirement for a UWB antenna which is compact structure, has wideband impedance matching, and provides a stable gain over the required operating bandwidth. Referring to FIG. 7 there is depicted a schematic of a UWB Device 700A employing an inventive Antenna 710 according to an embodiment of the invention integrated within the UWB Device 700A. Antenna Schematic 700B depicts the inventive Antenna according to an embodiment of the invention as a discrete element.

Within the schematic of the UWB Device 700 the Antenna 710 is depicted together with a UWB Daughter Board 720 and UWB Circuit Board 730 which are not depicted in detail. An exemplary implementation of UWB Device 700A is depicted in Image 700C wherein a UWB Transceiver 790 is depicted upon a printed circuit board (PCB) comprising Antenna 910 and UWB Daughter Board 720 which are interfaced to and attached to UWB Circuit Board 730. UWB Circuit Board 730 may comprise, for example, functional elements of the UWB Device 700A including, for example, sensors, microprocessor, memory, data interfaces, power supply interfaces, etc.

Antenna Schematic 700B depicts the inventive antenna which comprises a pair of UWB planar microstrip dipole antennas, first and second antennae, which provide spatial and polarization diversity by having a directive radiation pattern. Beneficially, the Antenna Schematic 700B provides for a compact structure, has wideband impedance matching, and provides a stable gain over the required bandwidth. Additionally, the design has high envelope correlation between the pair of antennas.

The antenna was designed to be coupled differentially from/to a UWB transmitter, UWB receiver or UWB transceiver and provide a dipole-like radiation pattern while delivering the desired radiation coverage on the sides of the antenna. A design goal for the antenna was to provide a higher radiation gain on the sides of the module (X-axis direction). Optimum performance of the linear (horizontal) polarization antennas is achieved when the transmitter and receiver are aligned and facing each other either parallel to or perpendicular to the ground.

The RF front-end of the antenna as depicted in Antenna Schematic 700B consists of a differential feed line structure 750 which is directly connected to the antenna. The differential feed line antenna being directly coupled to a UWB transmitter, UWB receiver or UWB transceiver such as, for example, the Spark Microsystems ST1020 UWB Transceiver which operates over the frequency range of 6.0-9.25 GHz. Accordingly, the system acts as a single differential antenna with a dipole like radiation pattern and linear polarization. This structure being a balanced circuit, can be connected directly to the UWB radio chip output pins (e.g. RFN and RFP of the SR1020 UWB Transceiver) without requiring the user of a balun.

The Antenna Schematic 700B depicts the PCB 740, differential feed line structure 750, vias between the upper and lower planes of the PCT 740, the lower metallization 770 of the antenna and the dual planar microstrip dipole antennas 780. The PCB 740 is essentially depicted transparent to allow the geometries of the planar microstrip dipole antennas 780 and lower metallization 770 to be viewed overlapping each other. The lower metallization 770 having a first slot 790A between the left and right microstrip dipole antennas, a second slot 790B within the lower metallization of beneath the left microstrip dipole antenna and a third slot 790C within the lower metallization beneath the right microstrip dipole antenna. The PCB 740 may for example be formed from FR4 whilst other materials may be employed according to the overall design of the antenna and its performance-cost objectives. Within the experiments and simulations performed by the inventors the FR4 PCB has a relative permittivity of 4.4 and a thickness of 0.8 mm. Accordingly, the antenna depicted in FIG. 7 offers the benefits of being compact and low cost compared to a MONOPOLE antenna according to the prior art.

Figure 8:
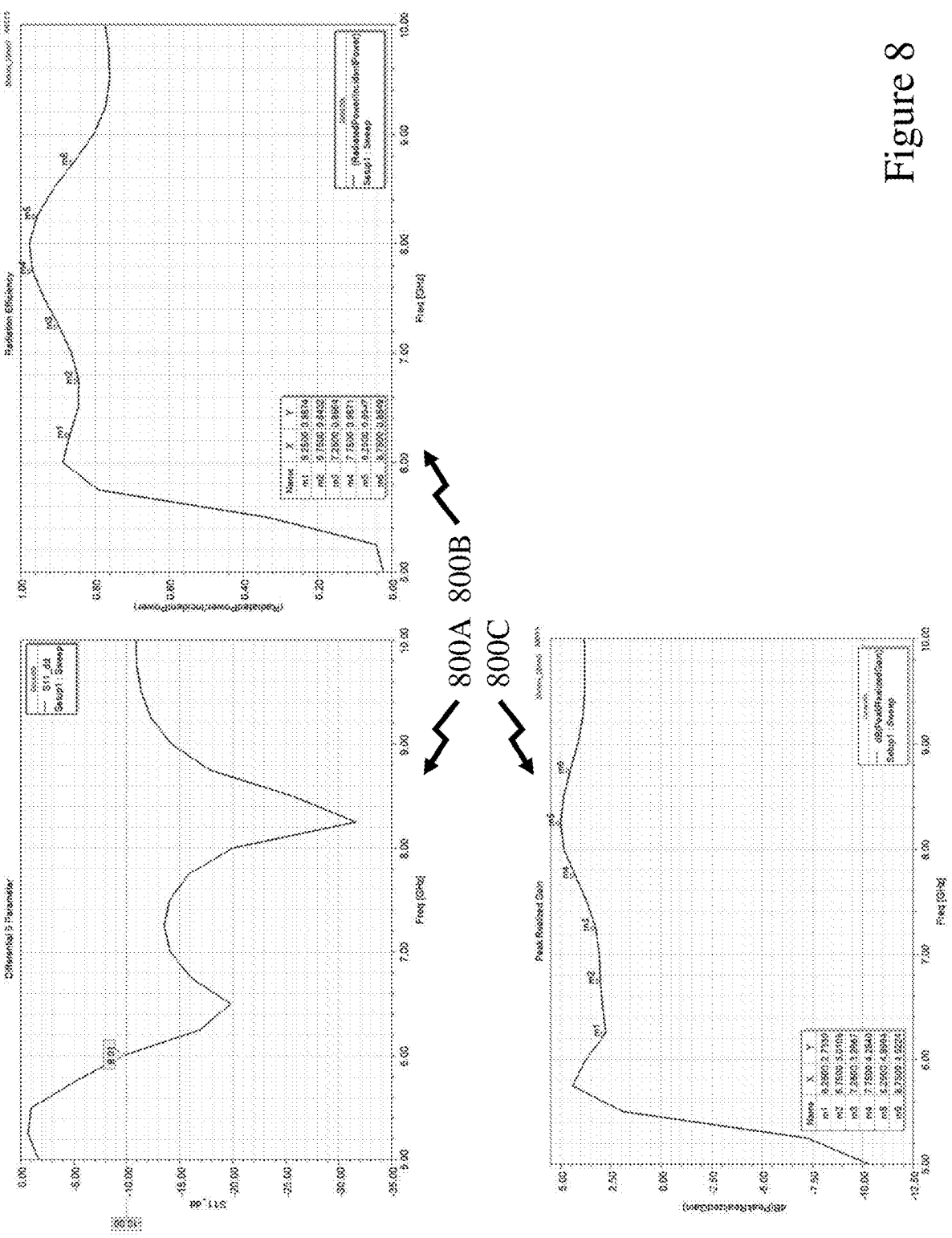
FIG. 8 depicts simulated performance of the compact diverse dipole antenna according to the embodiment of the invention depicted in FIG. 7.

Referring to FIG. 8 in first Plot 800A there is depicted the simulated differential S11 of the exemplary antenna. From this, it can be seen that the –10 dB impedance cutoff is at 6 GHZ and extends to above 10 GHz. Radiation efficiency of the antenna is obtained by calculating the ratio of radiated power over the incident power at the input of the antenna as depicted in second Plot 800B in FIG. 8. This is an accurate way of calculating the efficiency since it includes the impedance matching and insertion losses of the feeding lines. As evident in second Plot 800B an efficiency performance above 85% is achieved across the whole frequency band of design, 6.0 GHz-9.25 GHz of the exemplary antenna for operation with the SR1020 UWB Transceiver of Spark Microsystems. However, it would be evident to one of skill in the art that the novel inventive antenna can be designed for other operating frequency ranges without departing from the scope of the invention.

The peak realized gain is depicted in third Plot 800C in FIG. 8. A maximum gain of approximately 4.6 dB is evident including the losses. The peak gain variation over the frequency band is about 2.2 dB for this design which helps achieving a uniform output spectrum.

Figure 9:
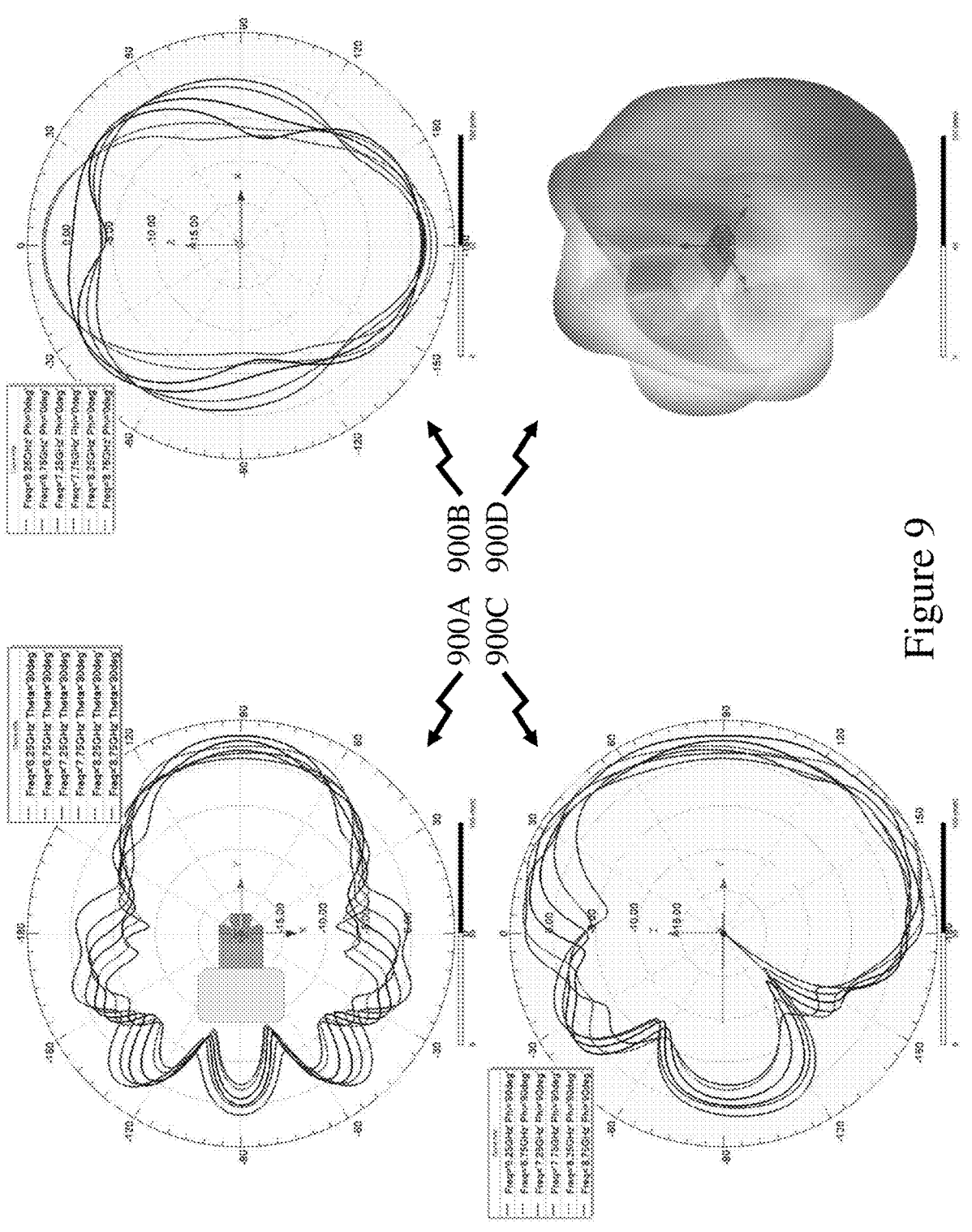
FIG. 9 depicts the emitted radiation patterns of the compact diverse dipole antenna according to the embodiment of the invention depicted in FIG. 7 at multiple frequencies.

Referring to FIG. 9 there are depicted first to third Plots 900A to 900C respectively representing the radiation patterns of the inventive antenna for three main cuts of X-Y, X-Z, and Y-Z for 6 different frequencies within the frequency range 6.25-8.75 GHz. A three-dimensional simulation of the radiation pattern of this inventive antenna at 7.5 GHz depicted in fourth Plot 900D in FIG. 9.

Figure 14:
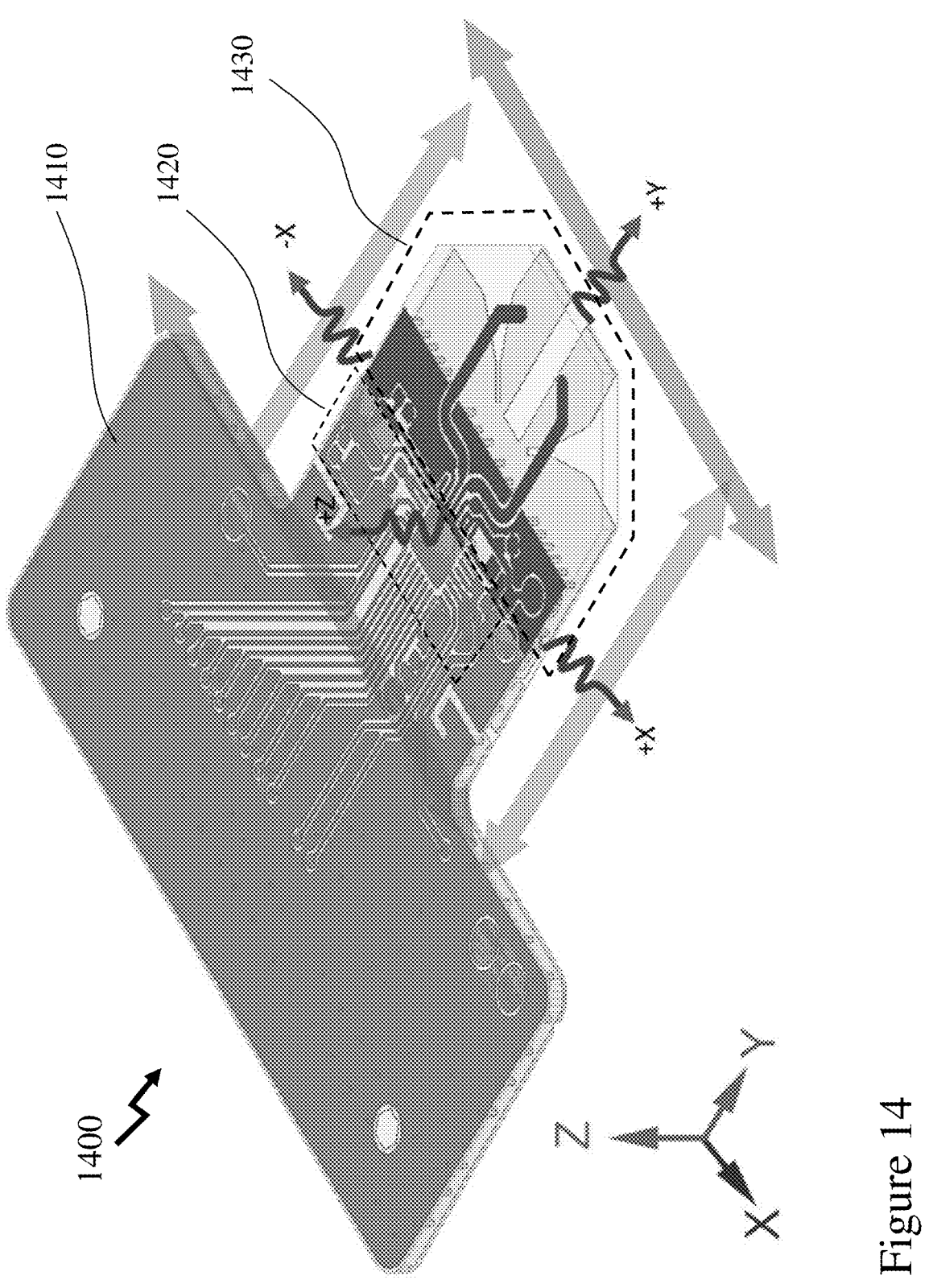
FIG. 14 depicts a compact diverse antenna module according to an embodiment of the invention employing a dipole antenna as depicted in FIG. 7 supporting operation as three-state diversity antenna.

Now referring to FIG. 14 there is depicts a compact diverse antenna module (DCAM) 1400 according to an embodiment of the invention employing a Dipole Antenna 1430 such as the antenna described and depicted in Antenna Schematic 700B in FIG. 7. DCAM 1400 supports operation as a three-state diversity antenna. As depicted the DCAM 1400 comprises a PCB 1410, a Circuit 1420 and Antenna 1430. The Antenna 1430 being a dual Vivaldi antenna as Antenna Schematic 700B in FIG. 7 to provide various radiation pattern and polarization diversity features. Within an embodiment of the invention the Antenna 1430, when fed differentially, has a dipole like radiation pattern with a dual linear polarization. In this mode, the Antenna 1430 features a linear polarization (±X axis) in the ±Z and +Y orientations whilst producing a linear polarization (±Y axis) in the ±X orientations. However, if fed single-ended then the Antenna 1430 acts as two isolated antennas with orthogonal radiation patterns.

Therefore, according to the functionality of the Circuit 1420 the same Antenna 1430 can be employed to provide a single state antenna with concurrent polarization diverse operation mode, a dual state antenna with two discrete operating diverse polarization modes and tri-state antenna supporting all three operating modes, namely the concurrent polarization diverse operation mode and the two discrete operating diverse polarization modes.

Within an embodiment of the invention the Antenna 1430 may be directly coupled to dual outputs of a wireless radio without requiring a balun. Accordingly, by providing a pair of 1×1 RF gates (switches) on each path the resulting circuit can provide the tr-state antenna through appropriate opera tion of the 1×1 RF gates. If these are normally open RF gates then closure of one or other of the RF gates provides for operation in one or other of the two discrete operating diverse polarization modes whilst closure of both provides for operation in the concurrent polarization diverse operation mode. If the RF gates are normally closed then the result is operation in the concurrent polarization diverse operation mode unless one or other of the RF gates is opened whereby operation in one or other of the two discrete operating diverse polarization modes is provided.

It would be evident that within other embodiments a single RF output from a wireless circuit may be employed with appropriate intermediate RF circuitry within Circuit 1420 to drive the Antenna 1430 with dual signals with or without RF gates according to whether the requirement is for default operation in the concurrent polarization diverse operation mode discretely or in combination with one or both discrete operating diverse polarization modes.

It would be evident that a wireless link employing Antenna 1430 and Circuit 1420 may initially configure to operate in each of the concurrent polarization diverse operation mode and discrete operating diverse polarization modes to determine the best configuration for operation based upon receipt of link performance data/configuration decision from another wireless radio communicating with the wireless radio employing Antenna 1430 and Circuit 1420. Similarly, the receiving wireless radio may cycle through each of the concurrent polarization diverse operation mode and discrete operating diverse polarization modes to determine the best configuration for itself against each of the concurrent polarization diverse operation mode and discrete operating diverse polarization modes to determine the best configuration of the transmitting wireless radio.

Optionally, the wireless radios may be configured to periodically determine which state to operate within, e.g., upon each powering up from a sleep mode, for each transmitted frame using data from a previous frame where the preamble of the frames cycle through the different modes.

Within an embodiment of the invention the PCB 1410 may be a dual layer FR4 PCB with a relative permittivity of 4.6 and a height of 0.8 mm having the benefits of being compact and low cost in common with the Antenna 1430 and wireless radios provided by Spark Microsystems Inc. of Montreal, Canada.

Figure 15:
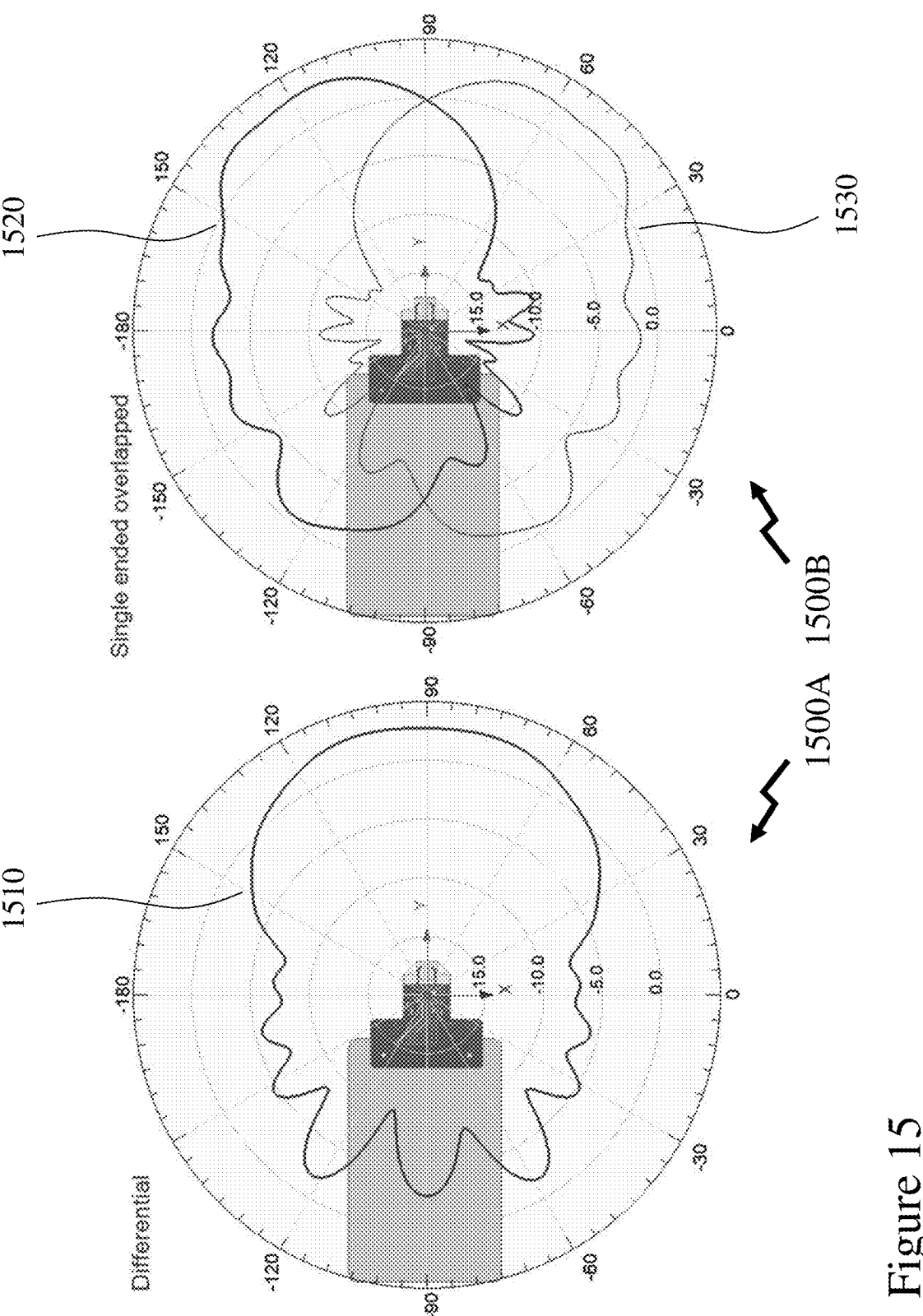
FIG. 15 depicts antenna radiation patterns for the compact diverse antenna module according to FIG. 14 in each of its three states.

Now referring to FIG. 15 there are depicted antenna radiation patterns for the compact diverse antenna module according to FIG. 14 in each of its three states. Within first Chart 1500A the measured radiation pattern for the concurrent polarization diverse operation mode is depicted by first Curve 1510. In second Chart 1500B the single sided discrete operating diverse polarization modes are depicted by second and third Curves 1520 and 1530 respectively.

5. Decision Feedback Equalization (DFE) for UWB Radio

As outlined above within exemplary UWB impulse radios the data symbols are transmitted using UWB impulses and the receiver detects these symbols using the energy that is integrated within a particular time period. As evident from FIG. 5 within an exemplary UWB impulse radio the receiver circuit may comprise a pair of parallel integrators (INT1 and INT2) which sum the signal energy where their outputs are ADCs (ADC1 and ADC2) and sent to a digital processor (not depicted for clarity). This being clocked based upon a clock generated by the UWB radio as depicted in FIG. 6.

However, the energy of the impulse within a given decision window/decision period (period) can "leak" to the next period, increasing the energy of the next symbol. This may arise for example as the result of Inter-Symbol Interference (ISI). This leakage can therefore potentially corrupt the decision making for reception of the next symbol. The inventors exploit a process they call "decision-feedback equalization."

Within this process it is assumed that part of the energy within a first period of decision making will leak across into a second period of decision making. Accordingly, if energy is detected within the first period then it is assumed to leak across to the next period and accordingly the leaked energy from the first period should be subtracted from the integrated energy of the second period (i.e. the next period). In this manner the remaining energy in the second period is the true energy of the second period (next period) that should be analyzed to detect its symbol.

Accordingly, within embodiments of the invention the energy detected in a second period is established using Equation (1) below where $E_1$ is the energy detected in the first period, $\Phi$ is the leakage factor, $E_{RAW}$ is the measured energy in the second period by the UWB receiver, and $E_{CORR}$ is the corrected energy employed in the decision making process as to what symbol was received in the second period.

$$E_{CORR} = E_{RAW} - \Phi \cdot E_1 \qquad (1)$$

Within embodiments of the invention the value of $\Phi$ may be fixed. Within other embodiments of the invention the value of $\Phi$ may be based upon one or aspects of the subsequent decision making process such as, for example, a characterisation of the wireless environment (likelihood of ISI), error rate of detected symbols, etc. Within embodiments of the invention the value of $\Phi$ may vary based upon data received from one or more other UWB devices.

It would be evident that within other embodiments of the invention that according to the wireless environment and the data rate etc. that ISI may "leak" across more than the next period. Accordingly, Equation (1) can be generalized to correct for leakage from a preceding N bits as given by Equation (2). Where $\Phi_j$ is the leakage factor applied to the power $E_j$ of the $j^{th}$ preceding bit.

$$E_{CORR} = E_{RAW} - \sum_{j=1}^{N} \Phi_j \cdot E_j \qquad (2)$$

6. UWB Impulse Energy Averaging

In an UWB impulse radio, with the data symbols being transmitted using UWB impulses, and the receiver detects the symbols using the energy that is integrated within a particular time periods. Within embodiments of the invention each symbol is sent multiple times and the detected energies within each of their corresponding time periods are averaged in order to improve the signal detection accuracy. Within embodiments of the invention rather than averaging the actual signal in its coherent radio form, this technique averages the output of the integrator that calculates the energy within a symbol period. Beneficially, this also means that process operates at lower clock frequency (the symbol frequency).

Accordingly, within embodiments of the invention the number N of repeats of a symbol may be defined based upon the firmware of the UWB radio. Within other embodiments of the invention N may be defined based upon one or more aspects of the data transmission and/or data reception process such that the value of N may vary over time. Within other embodiments of the invention N is defined by the transmitter and communicated to the receiver within a preamble or initial bit sequence.

Optionally, the N bits may be sequentially transmitted such that N samples are established by an integrator and then processed, with the requirement for buffering the sample. Optionally, the clock rate of the integrator is adjusted in dependence of N such that the integrator integrates over N periods thereby removing the requirement for additional buffer memory.

7. Early MISO (SPI) Propagation

Amongst the different interfaces that external devices can communicate electrically with a UWB device is the Serial Peripheral Interface (SPI) which is a synchronous seral communication interface specification, primarily for embedded systems but now used generally. SPI devices communicate in full duplex mode using a master-slave architecture usually with a single master (though some devices may support changing roles on the fly depending on an external (SS) pin). The master (controller) device originates the frame for reading and writing. Multiple slave-devices may be supported through selection with individual chip select (CS), sometimes called slave select (SS) lines.

Figure 10:
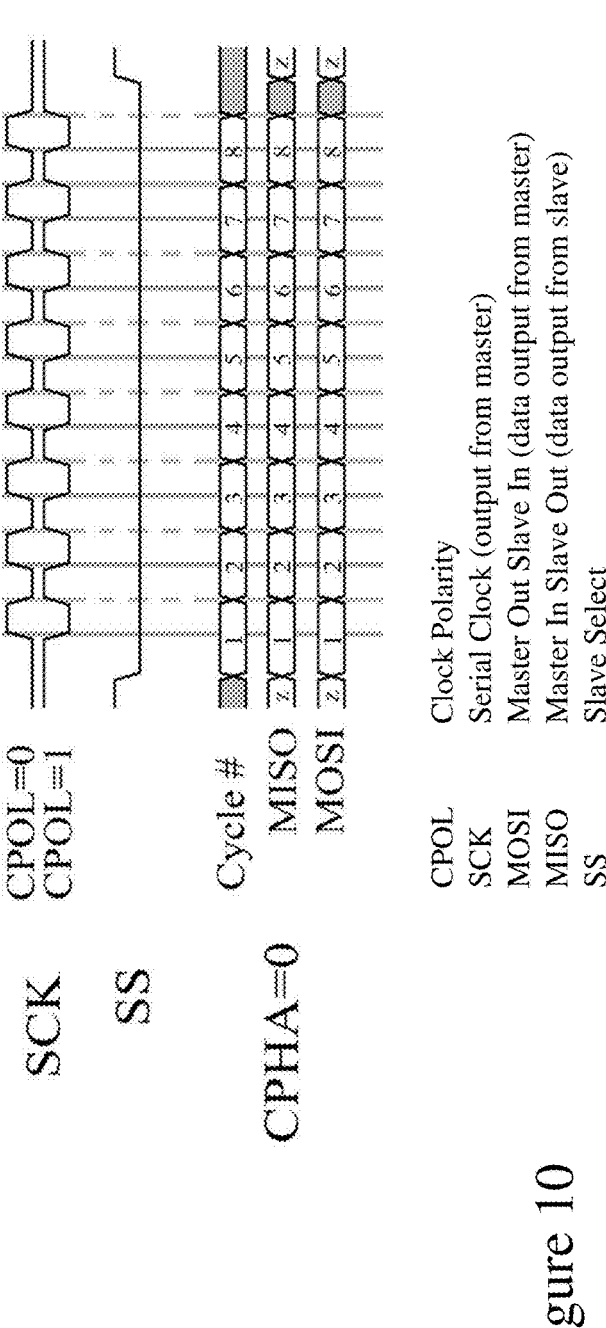
FIG. 10 depicts schematically an enhancement to a serial-parallel interface (SPI) for increased data rate.

FIG. 10 depicts a chronograph of an SPI interface according to the prior art where in the upper two lines are depicted the clock signal (SCK) when a clock polarity (CPOL) is set to zero (0) where for each cycle the clock idles at 0 and generates a pulse of 1. The clock phase (CPHA) depicted is CPHA=0 wherein the "out" side changes the data on the trailing edge of the preceding clock cycle, while the "in" side captures the data on (or shortly after) the leading edge of the clock cycle.

Accordingly, the prior art SPI gives a half SPI clock cycle of time for the propagation delay leading to the MISO input(s) of the SPI master because it is typically this propagation delay that limits the SPI data rate achievable. Accordingly, the prior art SPI interface as depicted in FIG. 10 has bit transitions that are triggered by the edges labelled with dashed lines and sampling (on both ends) is triggered by the edges labelled with solid lines.

However, within the novel enhanced SPI according to embodiments of the invention the MISO signal is switched each time half a clock cycle early at the solid line labelled transitions instead of just the dashed line labelled transitions. The result is that the novel modified SPI interface operates at a higher data rate. An inventive variant of the SPI protocol clocks data on both solid line labelled transitions and the dashed line labelled transitions would have approximately double the data rate.

The inventors have also implemented this within UWB devices establishing that the methodology is also valid for the Queued Serial Peripheral Interface (QSPI) as well as improving the data rate performance of SPI; see also Quad SPI) QSPI as it is for regular SPI and is already implemented in the prototype.

8. Variable Payload Through Split FIFO Buffer

With each UWB transmitter and UWB receiver are data buffers for storing data for transmission and reception.

Within embodiments of the invention established by the inventors these are double pointer circular FIFO buffers with a first pointer for read and a second pointer for write.

However, within WO/2020/186,332 the concept of an "invertible" OOK modulation format was established. Within an "invertible OOK" transmission protocol it is necessary to read twice the contents of the transmission buffer twice, once for counting '1's and '0's and once to actually extract the data for transmission. Accordingly, a third pointer which the inventors refer to as a "shadow pointer" is implemented to hold in memory the location of the beginning of the payload to transmit so that the read pointer can be brought back to the beginning of the payload to transmit after counting the 1's and 0's.

The memory is referred to by the inventors as a "split" FIFO and the UWB transmitter or transceiver device recycles the shadow pointer to point to the beginning of another payload written into the FIFO buffer. Accordingly, a UWB transceiver or UWB transmitter according to embodiments of the invention can have two immediately available payloads for transmission which it can conditionally choose from, for example depending upon an event, flag etc.

For example, within UWB transmitters and UWB transceivers according to embodiments of the invention then there is a configuration where the microcontroller of the UWB device does not know in advance whether it will have to transmit an auto-reply frame (i.e. replying to a successfully received frame) or transmit its own standalone frame (i.e. triggered by another event and in absence of a successfully received frame).

Accordingly, embodiments of the invention through the shadow point provide a mechanism for the hardware to make a decision as to what to transmit which is more efficient, faster and accurate timewise. This is because it does not require the microcontroller to intervene once one of the transmission conditions is fulfilled in order to write into the buffer or select the correct payload for the situation.

9. Precocious Auto-Reply

Within a UWB device the processing required to determine if an auto-reply frame should be sent following the reception of a frame can take a significant number of clock cycles. This arises from the inclusion of additional elements such as an interleaver and a Forward Error Correction (FEC) decoder, for example, in the path of the received frame data. Accordingly, if the frame processor waits to acquire all the required data from the fully decoded frame to decide if it must reply with an auto-reply frame, there will be a period of significant number of clock cycles between the initial frame and its auto-reply during which the channel will be unused and will appear to be clear to a third radio looking to transmit its own information. This number of clock cycles can easily exceed several tens of cycles, e.g. 50 or more.

This can lead to issues over channel concurrency where a pair of transceivers want to keep a channel occupied but other UWB radios identify the channel as empty during this period that the transceiver is processing the data received from the other transceiver. It also reduces channel utilization. Accordingly, the inventors have established a process wherein the transceiver starts transmitting the preamble of an auto-reply immediately after reception of the frame before it even has determined whether an auto-reply should be transmitted. The inventors referring to this as "precocious" auto-reply.

If the transceiver subsequently determines that the auto-reply frame should not be sent then the transmission of the auto-reply message is aborted during the preamble without any issue on either side of the link. If the transceiver subsequently determines that the auto-reply frame should be sent then it keeps transmitting the auto-reply and the channel has remained occupied right after the frame was received.

It would be evident that as the auto-reply frame transmission, when it is required, has been started earlier than if it would with the transceiver waiting till processing was completed then it ends earlier. Accordingly, channel bandwidth is used more efficiently.

10. Simple and Efficient Peak Energy Detection Implementation With Minimal Combinational Logic As outlined above the inventors have established UWB links which employ bundles of a plurality of pulses for transmitting each symbol where the number of pulses in the plurality of pulses, the frequency of each pulse of the plurality of pulses, the amplitude of each pulse of the plurality of pulses and a phase of each pulse of the plurality of pulses can be varied at rates up to the symbol rate to provide dynamic configuration of the emission spectrum of the UWB transmitter. Accordingly, the UWB receivers employ energy detection by integrating the overall energy of the plurality of pulses for a symbol so that the receiver can detect the symbols where the configuration of each symbol in terms of bandwidth, pulse frequencies etc. are varying.

This energy detection circuit, such as energy detection circuit 580 in FIG. 5, can be employed to provide a peak energy detection function for a UWB radio. Accordingly, the inventors employ this energy detection circuit to detect the presence and the strength of a strongest interferer in a given channel or to determine whether a channel is free to use for a given time slot (for time division multiple access (TDMA)) or at any time. The implementation established by the inventors is particularly frugal and efficient in terms of required circuit functionality and operation.

However, the inventors have also established a process whereby with minimal logic they prevent the detection of the preamble resulting in a modification of the gain of an automatic gain control (AGC) loop of the UWB radio. The role of this AGC loop is to adjust the gain of the receiver. According as the AGC loop seeks to adjust the gain according to the signal or noise floor observable at the receiver output the inventors establish within their inventive design that the SGC loop is prevented it from increasing the gain. The gain of the AGC loop can only be decreased during a listening period within an inventive UWB radio according to an embodiment of the invention. Additionally, the gain level at the end of a listening period is employed as an indicator of the peak energy level.

11. Synchronisation Word Expansion With Preserved Autocorrelation Properties As noted by the inventors within at least WO/2020/186, 332 a synchronisation word is employed to synchronize a receiver to a transmitter or a network. The former being particularly beneficial in ad-hoc networks etc. where there is no overall management of UWB radios by the network. However, it is beneficial in some instances to employ a longer synchronisation word in order to increase the robustness of the synchronisation process. However, it is also beneficial to minimize address and register space by employing a shorter synchronisation word.

Figure 11:
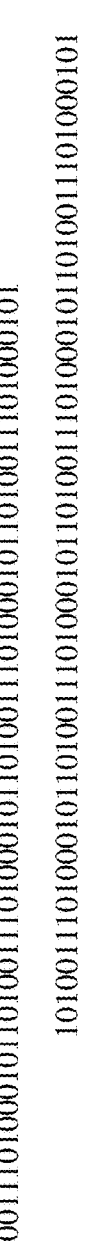
FIG. 11 depicts schematically the issue of autocorrelation from repeating a short synchronisation word to establish a longer synchronisation word.

If we consider that we wish to expand the size of a synchronisation word of a given maximum length then the most straightforward way to do so is to just repeat that synchronisation word (e.g. 0xA745 becomes 0xA745A745A745A745). However, this method severely deteriorates the autocorrelation quality of the synchronisation word. A good synchronisation word will have as little autocorrelation with every rotated or shifted copy of itself but an expanded synchronisation word which contains a repeating pattern like the previous example will strongly auto-correlate with a duplicate of itself shifted by 16 bits and less so (but still very significantly) by 32 bits as depicted in FIG. 11. The upper sequence depicting the synchronisation word and the lower sequence the synchronisation word offset by 16 bits.

Within the following discussion the initial synchronisation word is considered to be repeated N times to generate the extended synchronisation word. However, it would be evident to one of skill in the art that the concept can be extended to N where N≥2. Further, the example below is given for an initial synchronisation word of 16 bits but it would be evident to one of skill in the art that the concepts may be employed with synchronisation words of different lengths, e.g. 32 bit, 48 bit, 64 bit etc.

In order to address this issue without having to design into the UWB radio 4 times the address and register space to define an arbitrary synchronisation word 4 times as long, the initial synchronisation word of 16 bits in this example is replicated differently depending on which replication comes first. Each one of the four "instances" of the initial synchronisation word is a different combination of bit-wise inversions and flipped bit order. Accordingly, there are defined four "quarter" synchronisation words or synchronization word sub-words:

Quarter #1=0b1010011101000101 (0xA745), neither flipped nor inverted
  Quarter #2=0b0101100010111010 (0x58BA), inverted but not flipped
  Quarter #3=0b1010001011100101 (0xA2E5), flipped but not inverted
  Quarter #4=0b0101110100011010 (0x5D1A), both flipped and inverted Accordingly, an example of the expanded synchronisation word becomes:
  0b101001110100010101011000101110101010001011 10010101110100011010

The synchronisation word sub-words can be employed in any order for any synchronisation word in order to optimize robustness and autocorrelation when expanding the original shorter synchronisation word. The inventors also note that this is an efficient process implementable in hardware circuitry. Further, a base (initial) synchronisation word that has good autocorrelation properties with itself, both the bit-wise inverting and the bit order flipping operations preserves these desirable properties. The inventors note that the method is not universally beneficial as it does provide as good an autocorrelation between synchronisation words that are close to being symmetrical and their flipped duplicate because the bit order flipping operation does not change the result that much but it is still a significant improvement over expanding a synchronisation word with unmodified copies of itself.

12. Low Complexity Efficient Infinite Impulse Response (IIR) Filters for Continuous Preamble Correlation Measurement and Detection Preamble detection is performed by measuring the correlation between the receiver output signal over time and the preamble pattern. For example, a preamble pattern of . . . 10101010 . . . is a repeating pattern of two bits. To best extract this signal from the noise and ensure maximally reliable detection, we only need to compute the difference between the sum (average) of the odd samples and the sum of the even samples: A strong absolute value (negative or positive) indicates the presence of the preamble pattern in question. However, these sums or averages cannot perpetually accrue all receiver samples. They have to be weighted to represent more accurately the most recent portion of the signal received to react quickly enough to the beginning of the preamble.

Within the prior art one solution to this is store N individual samples from the receiver separately as, for example, correlator would (as it is needed for the synchronisation word) and replace the oldest sample by the newest every clock cycle. However, this solution is costly both in terms of semiconductor die area and dynamic power consumption (especially the clock tree it requires).

Initially to address this the inventors established a different method wherein the odd and even samples are summed separately into accumulators and these accumulators are reset after a predetermined number of clock cycles, e.g. 16. This lowers the die area assigned to this function but makes the preamble detection less responsive (and also more uncertain in responsiveness delay) because the preamble correlation is only verified every eighth cycle (using only a logical shift to adjust the threshold to the number of samples accumulated).

The inventors have then extended this initial concept into a process that does not require the accumulators to be reset regularly. This is achieved by treating the succession of every Nth sample of the preamble pattern as its own signal and putting it through a low complexity (for example first order) low-pass infinite impulse response (IIR) filter. For the example above of a repeating pattern of two bits (10) in a system employing 4 integration windows (named A, B, C and D) per clock cycle then 8 accumulators are needed. These being one for each combination of odd/even cycle and integration window. The example of 4 integration windows being an exemplary scenario although it would be evident to one of skill in the art that other numbers of integration windows may be employed without departing from the scope of the invention.

If every time a new sample is added into one of those accumulator, a fraction of $\frac{1}{2^M}$ of the previous accumulated value is subtracted from that value while the new sample is added (and scaled to fit the subtraction), this effectively reproduces the behavior of a first-order IIR low-pass filter with an input signal constituted of the succession of every eighth sample only and the result in the accumulator as the output. The value of M in $\frac{1}{2^M}$ can be any integer and every increment of M doubles the impulse response spread (i.e. halves the bandwidth). Using powers of two is beneficial as hardware is required for multiplication or division; the subtrahend is obtained by a simple bit shift of the accumulator value. This approach can be adjusted for any number of integration windows per clock cycle and any number of clock cycles per preamble pattern repetition without departing from the scope of the invention. The product of both is the number of accumulators required (if we want to keep the '1's and '0's apart).

13. Soft and Hard Correlators for Versatile Synchronisation Word Detection

As outlined above a UWB radio may perform correlation as part of establishing synchronisation. Other applications for correlation within UWB radios may exploit embodiments of the invention but for simplicity the following description is presented with respect to synchronisation.

Using the full value of each receiver sample to compute a correlation, what the inventors refer to as a soft correlation, between the received signal and a synchronisation word pattern produces a more accurate measure of the correlation of the signals because the signal is computed at a higher resolution than with what the inventors refer to as a hard correlation, where for each bit a thresholding step first decides if each sample is more likely representing a '1' or a '0' before the correlation computes a single bit per sample. The inventors have established that under certain conditions the soft correlator is not preferable to a hard correlator. Accordingly, an obvious way to optimize for the "best of both worlds", is to implement both correlators and select only one of the two to decide if the synchronisation word looked for is detected or not. However, this requires that the UWB radio knows beforehand which correlator is better suited for each frame reception.

In contrast, the inventors have established an alternate implementation where both soft and hard correlators are implemented and used simultaneously, each with its own individual threshold. This allows UWB radios exploiting embodiments of the invention to detect the synchronisation word with increased versatility and reliability.

Within the inventive design by the inventors the synchronisation word is only considered to have been received if the received signal meets the correlation thresholds of both correlators simultaneously. Accordingly, it is an easy logic decision to implement to decide whether the received signal has met the correlation thresholds of both correlators, i.e. a logical AND. However, within other embodiments of the invention it may be a decision making process based upon the received signal meeting the correlation threshold of either one of them, a logical OR.

14. Phase Data Sources for Improved Accuracy and/or Efficiency in Ranging Measurements Within WO/2019/000,075 the inventors presented different ranging methods between UWB radio. Within the implementations of these the inventors implemented collection of phase offset information from the preamble energy distribution during a frame exchange which included an auto-reply message. As this ranging feature was initially considered as being an additional function for a UWB radio tailored to radio communication then there are several factors that can be optimized to get more accurate ranging results. However, these are often at the detriment of the UWB radio's regular communications efficiency. Amongst these factors is clock drift which for the ranging application makes it beneficial to collect the phase data on both sides of the link at times that are as close to one another as possible. This is one manner in which the ability of the UWB radio to auto-reply to a frame is necessary for ranging. However, collecting that phase data from both preambles means the time difference between the two phase data collections is approximately as long as the initial frame.

Accordingly, the inventors have sought mechanisms that offer a reduction in this time difference. As a result the inventors inventive UWB radios can in addition to the mechanism above also gather phase other phase data in another form from another source. The inventors have designed the phase tracker within their UWB radios to measure and continuously track the phase offset as it drifts during reception of a frame. Accordingly, the inventors have designed the UWB radio such that it can take the phase data of the initial frame reception from this source at the end of the frame and the phase data of the auto-reply frame reception at its beginning right after the synchronisation word. The error induced by the clock drift between the two nodes on the ranging measurement can be greatly reduced this way.

15. ISI Detection Via Energy Distribution Across Preamble Accumulators

As outlined above in Section 12 multiple accumulators are employed within those embodiments of the invention to enhance preamble detection. These multiple accumulators hold phase data which is the accumulated values for the preamble employed by a ranging function of the UWB radio. This phase data can be used to get a low (but sufficient) time resolution representation of the impulse response of the transmitted pulse bundle through the transmission channel and the receiver. If there is a measurable amount of ISI (Inter-Symbol Interference), this can be determined from this impulse response provided the preamble pattern (and therefore, the time span covered by the number of accumulators) is longer than the impulse response.

An alternative option of the options for ranging phase data collection is to store all preamble accumulator values separately (e.g. all 16 accumulator values when the longest preamble pattern is 4 clock cycles) where the inventors have established that with an appropriate preamble pattern length selected then ISI can be detected before it becomes too strong and impacts the Packet Error Rate (PER) and ISI mitigation feature(s) of the UWB radio can be implemented and/or adjusted accordingly. Accordingly, a decision can be made with respect to ISI mitigation features rather than simply trying them blindly.

16. Jittering Symbol Rate (Pulse Position Dithering) to Circumvent Focused ISI Issues Within the prior art one solution to mitigating ISI is reducing the data rate to give more time for the impulse response of one pulse bundle to die off before the next one is received. However, the inventors have established an alternate solution wherein the UWB radio systematically varies the pulse position every symbol without changing the effective data rate.

For example, every other clock cycle, the position in time of a pulse bundle may be transmitted could be delayed by a quarter of a clock cycle. Accordingly, the time difference between two consecutive pulse bundles may be 5/4 or ¾ of a clock cycle and not 1 clock cycle exactly. Within other embodiments of the invention the offset may be other values other than ¼ clock cycle. This being a value compatible with products manufactured by Spark Microsystems which employ four integration windows per clock cycle within the UWB radio so that these clock offsets are already generated within the UWB radio.

The inventors note that whilst this pulse position dithering or jittering the symbol rate is not a solution to all ISI problems. However, within observed real world scenarios a common occurrence to link degradation by ISI is the presence of a single reflection which is just significantly strong enough to cause ISI. Accordingly, by exploiting the inventive mechanism and giving a UWB radio the ability to change the "pitch" between bits the way the UWB radio can counter ISI from a reflection delayed by approximately 1 clock cycle more than the more direct signal path. Naturally, in the case where this delay difference is closer to 5/4 or ¾, it's always an option to revert back to the constant time difference of 1 clock cycle between each bit to dodge destructive interference.

17. Fast And Ultrafast Pulse Position Modulation (Coding) Schemes

Within WO/2020/186,332 the inventors outlined multiple digital information encoding schemes which were established to offer different compromises between three measures of merit of UWB links according to the needs of the application. These measures or figures of merit being channel bandwidth efficiency (which is correlated to energy efficiency), spectral efficiency and link robustness. Channel bandwidth efficiency is achieved by minimising the number of symbol periods required to exchange a given amount of information which also translates into a faster and lower latency link. Optimizing spectral efficiency allows to transmit more information for a given amount of electromagnetic radiation for which there are generally regulatory limits and accordingly there is a compromise between datarate and link margin (robustness) for a UWB radio because of these regulatory limits. The less pulses ('1's after encoding) per bit of information there is (with the worst possible pattern of data), the better the spectral efficiency. Link robustness is effectively determined by the signal-to-noise ratio, resiliency to interferences and correlates with the hamming distance between each symbol of the modulation coding scheme.

Within WO/2020/186,332 the inventors described encoding schemes including "invertible" On-Off Keying (OOK) and Double PPM., 2-bit Pulse Position Modulation (PPM), 4-bit PPM, to N-bit PPM. Invertible OOK addressed the regulatory emission limit issue by flipping patterns of data for which there are more '1's than '0's so that the benefits of OOK are maintained but with a format allowing increased transmission power. Thus invertible OOK offers increased spectral efficiency for no degradation in link robustness almost no loss in bandwidth and energy efficiency (save for an extra header field to denote whether flipping was enabled or not). Double PPM in contrast was conceived to alleviate the energy and bandwidth burden of 2-bit PPM for the same spectral efficiency.

The inventive modulation schemes presented below, which the inventors refer to as "chip-codes", are fast (and ultrafast) PPM modulation schemes designed to optimize the compromise between these figures of merit outlined above where the new chip-codes leverage the ability to measure the position (time of arrival) of a pulse bundle with a much higher resolution. Classically, the standard 1-bit and 2-bit PPM use a single integration window sample per clock period where the received signal should be the strongest and the other three samples are ignored because they typically are at a much worse SNR.

In contrast the inventors "fast" PPM modulation schemes exploit all integration window samples available. The fast PPM chip-codes do not just identify the sample with the strongest signal but also quantify the energy distribution between the neighboring samples. This allows, for example, for the reception of a symbol of 4 pulse positions (2-bit PPM) within two clock cycles (8 integration window samples) instead of four clock cycles: Suppose that for a 2-bit PPM symbol, a pulse bundle transmitted at t=0 means 0b00, at t=¼ clock cycles, it means 0b01, at t=²⁄₄, it means 0b11 and it means 0b10 for when t=¾. This modulation scheme is what the inventors refer to as the "ultrafast 2-bit PPM". The same information encoded in the same fundamental way as the classical 2-bit PPM modulation scheme but now occupying only a quarter of the air-time as that in the prior art.

If, as the inventors employ in some ISI mitigation schemes an empty clock cycle after every clock cycle with the pulse bundle representing the two bits of information is employed then the effective bandwidths gain is 50%. This still represents a significant gain over the prior art.

Three other modulation schemes designed by the inventors are "fast 2-bit PPM", "fast 1-bit PPM", and "ultrafast 1-bit PPM." The "fast" modifier indicates a pitch between the pulse positions of ½ a clock cycle. The "ultrafast" modifier indicates ¼ of a clock cycle of pitch. It would be evident that other pulse pitches may be employed according to the capabilities of the UWB radios.

Whilst the inventors note that these chip-codes are more susceptible to clock drift and phase tracking errors as they rely upon an accurate clock offset figure, e.g. as derived from a phase tracker as discussed above, the improvements in bandwidth, energy and latency make it worthwhile especially for frame receptions with good SNR.

Referring to FIGS. 12 and 13 there are depicted exemplary transmission sequences for different combinations of PPM encoding schemes according to embodiments of the invention with different values of symbol redundancy to increase signal to noise ratio and provide inter-symbol interference mitigation. Accordingly, the inventive "fast 1-bit PPM", "fast 2-bit PPM" and "ultrafast 2-bit PPM) are depicted relative to the prior art and the inventors previous chip-codes Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:

providing an ultra wideband (UWB) device; and executing a process with respect to the UWB device; wherein the UWB device is a UWB receiver forming part of a wireless radio and the process comprises:

receiving a frame of data from another wireless radio upon the wireless radio comprising the UWB receiver;

immediately starting to transmit a preamble of an auto-reply message with the wireless transceiver after receipt of the frame of data;

processing the received frame of data;

determining whether the auto-reply frame should not be sent in dependence upon the processing of the received frame of data;

upon determining the auto-reply frame should not be sent terminating the transmission of the preamble; and upon determining the auto-reply frame should be sent continuing to transmit the preamble and the remainder of the auto-replay frame.

2. The method according to claim 1, wherein a channel upon which the frame of data was transmitted is kept occupied whilst the determination is made such that it does not appear clear to a further wireless radio.

3. The method according to claim 1, wherein the process further comprises adjusting a gain of an automatic gain control loop of the UWB receiver of the wireless radio;

the received frame of data comprises a portion of data received from the another wireless radio within a listening period;

the gain of the automatic gain control loop cannot be increased during the listening period;

the gain of the automatic gain control loop can be decreased during the listening period; and gain of the automatic gain control loop at the end of the listening period is employed as an indicator of a peak energy level of wireless signals received from the another wireless radio during the listening period.

4. The method according to claim 1, wherein processing the received frame of data comprises:

detecting a preamble pattern comprising a repeating preamble of S bits with a decision making circuit which comprises R integration windows per clock cycle;

providing a set of M accumulators forming part of a preamble detection circuit of the receiver;

adding new samples to the set of M accumulators; wherein for each new sample added to an accumulator of the set of M accumulators a fraction X of the previous accumulated value is subtracted whilst the new sample is added;

$M = S \times R$; and the fraction X is $\frac{1}{2}^N$ where N is a positive integer.

5. A system comprising:

an ultra wideband (UWB) device; and a controller coupled to the UWB device executing a process with respect to the UWB device; wherein the UWB device is a UWB receiver forming part of a wireless radio and the process comprises:

receiving a frame of data from another wireless radio upon the wireless radio comprising the UWB receiver;

immediately starting to transmit a preamble of an auto-reply message with the wireless transceiver after receipt of the frame of data;

processing the received frame of data;

determining whether the auto-reply frame should not be sent in dependence upon the processing of the received frame of data;

upon determining the auto-reply frame should not be sent terminating the transmission of the preamble; and upon determining the auto-reply frame should be sent continuing to transmit the preamble and the remainder of the auto-replay frame.

6. The method according to claim 5, wherein a channel upon which the frame of data was transmitted is kept occupied whilst the determination is made such that it does not appear clear to a further wireless radio.

7. The method according to claim 5, wherein the process further comprises adjusting a gain of an automatic gain control loop of the UWB receiver of the wireless radio;

the received frame of data comprises a portion of data received from the another wireless radio within a listening period;

the gain of the automatic gain control loop cannot be increased during the listening period;

the gain of the automatic gain control loop can be decreased during the listening period; and gain of the automatic gain control loop at the end of the listening period is employed as an indicator of a peak energy level of wireless signals received from the another wireless radio during the listening period.

8. The method according to claim 5, wherein processing the received frame of data comprises:

detecting a preamble pattern comprising a repeating preamble of S bits with a decision making circuit which comprises R integration windows per clock cycle;

providing a set of M accumulators forming part of a preamble detection circuit of the receiver;

adding new samples to the set of M accumulators; wherein for each new sample added to an accumulator of the set of M accumulators a fraction X of the previous accumulated value is subtracted whilst the new sample is added;

$M = S \times R$; and the fraction X is $\frac{1}{2}^N$ where N is a positive integer.

9. Computer executable instructions stored within a non-transitory storage medium where the executable instructions when executed by a controller configure the controller to execute a process; wherein the controller is coupled to the non-transitory storage medium and an ultra wideband (UWB) device; and the process executed is with respect to the UWB device; wherein the UWB device is a UWB receiver forming part of a wireless radio and the process comprises:

receiving a frame of data from another wireless radio upon the wireless radio comprising the UWB receiver;

immediately starting to transmit a preamble of an auto-reply message with the wireless transceiver after receipt of the frame of data;

processing the received frame of data;

determining whether the auto-reply frame should not be sent in dependence upon the processing of the received frame of data;

upon determining the auto-reply frame should not be sent terminating the transmission of the preamble; and upon determining the auto-reply frame should be sent continuing to transmit the preamble and the remainder of the auto-replay frame.

10. The computer executable instructions according to claim 9, wherein a channel upon which the frame of data was transmitted is kept occupied whilst the determination is made such that it does not appear clear to a further wireless radio.

11. The computer executable instructions according to claim 9, wherein the process further comprises adjusting a gain of an automatic gain control loop of the UWB receiver of the wireless radio;

the received frame of data comprises a portion of data received from the another wireless radio within a listening period;

the gain of the automatic gain control loop cannot be increased during the listening period;

the gain of the automatic gain control loop can be decreased during the listening period; and gain of the automatic gain control loop at the end of the listening period is employed as an indicator of a peak energy level of wireless signals received from the another wireless radio during the listening period.

12. The computer executable instructions according to claim 9, wherein processing the received frame of data comprises:

detecting a preamble pattern comprising a repeating preamble of S bits with a decision making circuit which comprises R integration windows per clock cycle;

providing a set of M accumulators forming part of a preamble detection circuit of the receiver;

adding new samples to the set of M accumulators; wherein for each new sample added to an accumulator of the set of M accumulators a fraction X of the previous accumulated value is subtracted whilst the new sample is added;

$M = S \times R$; and the fraction X is $\frac{1}{2}^N$ where N is a positive integer.

\* \* \* \* \*